US005771231A

United States Patent [19]
Watanabe

[11] Patent Number: 5,771,231
[45] Date of Patent: Jun. 23, 1998

[54] ATM EXCHANGE

[75] Inventor: Yoshihiro Watanabe, Kawasaki, Japan

[73] Assignee: Fujitsu Limited, Kanagawa, Japan

[21] Appl. No.: 518,963

[22] Filed: Aug. 24, 1995

[30] Foreign Application Priority Data

Jan. 5, 1995 [JP] Japan ..................... 7-000185

[51] Int. Cl.$^6$ .................................................. H04L 12/56
[52] U.S. Cl. ........................................ 370/377; 370/399
[58] Field of Search .................................. 370/362, 364, 370/389, 392, 395, 396, 397, 398, 399; 379/114, 121, 126, 127

[56] References Cited

U.S. PATENT DOCUMENTS 5,067,123  11/1991  Hyodo et al. ............................ 370/397
5,311,509   5/1994  Heddes et al. .......................... 370/397
5,483,527   1/1996  Doshi et al. ............................ 370/399

Primary Examiner—Benedict V. Safourek
Attorney, Agent, or Firm—Helfgott & Karas, P.C.

[57] ABSTRACT

An ATM exchange having an ATM switch for switching a cell, which has arrived from a prescribed incoming line, to a prescribed outgoing line based upon a VPI/VCI contained in the header of the cell is provided with a call processor for executing call processing control, and with a traffic processor for collecting traffic data. The call processor executes call processing control based upon a connect/disconnect request, and the traffic processor collects traffic data (NDC data, PM data, billing data) in a subscriber line or traffic data in a transmission line. This makes it possible to collect and edit traffic data and billing data without burdening the call processor.

20 Claims, 21 Drawing Sheets

FIG.3

| VPI/VCI OF INPUT CELL | NEW VPI/VCI | TAG INFORMATION |
|---|---|---|
| TVPI/TVCI | | |
| CVPI/CVCI | | |
| ------- | | |

ATM EXCHANGE

BACKGROUND OF THE INVENTION

This invention relates to an ATM exchange and, more particularly, to an ATM exchange for acquiring traffic data without subjecting a call processor to a load.

ATM (Asynchronous Transfer Mode) switching technology has been agreed upon by the ITU as the next generation of switching technique, and research is being carried out at various facilities to develop technology for the purpose of realizing broadband ISDNs.

ATM switching technology makes it possible to convert all types of information to fixed information (referred to as a "cell"), and to transmit the fixed information at high speed, irrespective of whether the information is continuous information such as audio or moving pictures or burst information such as data, and irrespective of communication speeds. More specifically, in an ATM transmission system, logical links are established in multiplexed fashion on a Physical line so that the line may be allocated to a plurality of calls. Moving-picture data or audio data from a terminal corresponding to each call is disassembled into fixed-length information units (the cells mentioned above), and the cells are transmitted over the line sequentially to realize multiplexing.

As shown in FIG. 19, a cell is composed of a fixed-length block of 53 bytes of which five bytes constitute a header HD and 48 bytes an information field (also referred to as a "payload") DT. In order that the destination of the cell will be understood even after data is broken down into blocks, the header HD includes a virtual channel identifier (VCI) for call identifying purposes. The header HD further includes a virtual path identifier (VPI) that identifies other paths, a generic flow control (GFC) used in flow control between links, payload type identification (PTI) and a header error control (HEC) code, which is a code for correcting errors in the header.

FIG. 20 is a diagram showing the general configuration of an ATM network useful in describing an ATM transmission system. Shown in FIG. 20 are ATM terminal units $1a$, $1b$ and an ATM network 3. The ATM network 3 has an information network $3a$ that transmits data cells and a signal network $3b$ that transmits control signals. Call processing processors (CPU) $3d$-1~$3d$-n of ATM exchanges $3c$-1~$3c$-n in the information network $3a$ are connected to the signal network $3b$.

When a call operation is performed so that the terminal $1a$, which is on the originating side, may call the terminal $1b$, which is on the terminating side, a cell assembler within the originating terminal $1a$ partitions a SET-UP message (data that includes the originating number, terminating number, type of terminal, average cell speed, maximum cell speed, etc.) into cell units, attaches a signal VCI (determined in advance for each terminal) to each item of partitioned data to form a signal cell and sends the signal cell to the ATM network 3.

If a signaling device of the ATM exchange (the exchange on the originating side) $3c$-1 receives a signal cell, the signaling device assembles the information contained in the signal cell and notifies the CPU $3d$-1 of the information. The CPU executes such call processing as processing for analyzing calling-party service, billing processing and processing for interpreting digits on the side of the called party, decides a virtual path (VPI) and call identifying information (VCI) based upon the reported average cell speed and maximum cell speed and, in accordance with a No. 7 protocol, sends the next relay exchange $3c$-2 a SET-UP message, which includes the originating number, terminating number, VPI, VCI and other data, via the signal network $3b$. The relay exchange $3c$-2 executes processing similar to that of the originating exchange $3c$-1. Thereafter, processing similar to that described is performed from one exchange to the next until finally a path and the relay ATM exchanges $3c$-2, $3c$-3 from the originating exchange $3c$-1 to the ATM exchange (the exchange on the terminating side) $3c$-n, to which the terminating terminal is connected, are decided. If the terminating exchange $3c$-n receives a SET-UP message containing the originating number, the terminating number and the VCI of the higher-order ATM exchange $3c$-3, then the exchange $3c$-n assigns a prescribed VCI to the terminating terminal $1b$. If the terminating terminal $1b$ is capable of communicating, then the signal network $3b$ sends the originating exchange $3c$-1 an ALT message, which indicates that communication is possible, via the signal network $3b$, and the originating exchange assigns a prescribed VCI to the originating terminal $1a$. If the called party takes the receiver off the hook after the transmission of the ALT signal, the terminating terminal sends a CONN message to the originating terminal $1a$ via the signal network. Communication becomes possible as a result of the foregoing operations.

Each of the ATM exchanges $3c$-1~$3c$-n on the paths registers the following, for each path, in an internal routing table (conversion table) in a form correlated with the VCI of the higher-order ATM exchange: (1) routing information for specifying the outgoing line (outgoing highway) of the cell having the particular VCI, and (2) a new VCI and new VPI, which are added on to the outputted cell.

When data communication is performed, the originating terminal $1a$ disassembles data to be transmitted into prescribed byte lengths, adds on a header containing the allocated VCI to produce a cell and sends the cell to the ATM network 3. When each of the ATM exchanges $3c$-1~$3c$-n receives an input data cell from the higher-order exchange via the prescribed incoming highway (incoming line), the ATM exchange refers to its routing table to replace the VPI/VCI of the inputted cell, adds on tag information and sends-the cell out on the prescribed outgoing highway (outgoing line) based upon the tag information. As a result, the data cell outputted by the originating terminal $1a$ arrives at the terminating exchange $3c$-n via the path that decided by call processing. The terminating terminal $3c$-n refers to its routing table, changes the VCI attached to the input cell to the VCI allocated to the terminating terminal and then sends the cell to the line to which the terminating terminal $11b$ is connected.

Thereafter, the originating terminal $1a$ sends cells to the terminating terminal $1b$ in successive fashion and the terminating terminal $1b$ assembles the information field DT contained in the received cells, thereby restoring the original data.

The foregoing relates to a case for dealing with one call. However, by changing the-mutually held VCI values at both ends of each line between the terminal and ATM exchange and between the mutually adjacent ATM exchanges, logical links conforming to a number of calls can be established on one line. As a result, high-speed multiplexed communication may be realized. In accordance with an ATM transmission system, information from information sources such as moving pictures, data and audio having different transmission rates can be multiplexed. As a consequence, a single transmission line can be used in a very effective manner. Moreover, re-transmission control and complicated communication procedures such as implemented by software through packet switching are no longer necessary and it is possible to achieve ultra-high-speed data transmission on the order of 150 to 600 Mbps.

Further, an ATM exchange has a buffering function according to which calls can be accepted and sent to a terminating terminal without making an originating terminal wait even in a case where a large number of calls are generated in the ATM exchange or terminating terminal. For example, if calls directed to the terminating terminal 1b are generated by a large number of terminals simultaneously and, as a result, there is no longer a vacancy on the line between the exchange 3c-n on the terminating side and the terminating terminal 1b, cells that cannot be sent to the terminating terminal occur. In such case the exchange 3c-n on the terminating side buffers the cells not sent and transmits the cells when a vacancy develops in the line, thereby accepting the call and sending it to the terminating terminal without making the originating terminal wait.

FIG. 21 is a block diagram showing the construction of a self-routing ATM exchange, which includes a basic switching unit SWU, a header-converting and tag-attaching unit HCTA and a call processor CPU. Though the ATM exchange is so constructed that a single-stage self-routing switch module SRM1 is present between the incoming and outgoing lines, an arrangement may be adopted in which self-routing switch modules are connected in a plurality of stages. The input side of the module SRM1 is connected to incoming lines (incoming highways) #1~#3 via the header-converting and tag-attaching unit HCTA, and the output side of the module SRM1 is connected to outgoing lines (outgoing highways) #1~#3.

The header-converting and tag-attaching unit HCTA is equipped with VC converter circuits $VCC_1$~$VCC_3$, which correspond to the incoming lines #1~#3, respectively. The VC converter circuits $VCC_1$~$VCC_3$ each have a routing table (not shown), refer to the table to replace the VPI/VCI of an input cell, add tag information onto the cell and then send the cell to the basic switching unit SWU.

The call processor CPU executes call processing control at the time of an outgoing call to (1) decide the VCI and VPI assigned in place of the VPI/VCI of an input cell, (2) decide tag information that designates an outgoing line conforming to the location of the terminating terminal, and (3) write the newly attached VCI, VPI and tag information in the routing table of the VC converter circuit $VCC_i$ (i=1, 2, 3) in a form made to correspond to the VPI/VCI of the input cell.

When call processing controls ends and the cells enter the prescribed incoming lines via the higher-order ATM exchange, the VC converter circuits $VCC_1$~$VCC_3$ connected to these incoming lines read the information, which conforms to the VCIs attached to the input cells, out of the routing tables. These circuits add tag information onto the cells, replace the VPI/VCIs of the cells with the VPI/VCIs read out and then send the cells to the basic switching unit SWU.

The self-routing switch module SRM1 of the basic switching unit SWU sends the cells to the prescribed outgoing lines using the tag information. The tag information is removed by a post-processing circuit (not shown) before a cell is sent to an outgoing line.

FIG. 22 is a circuit diagram showing a specific example of the self-routing switch module (SRM1). The module includes tag information detection circuits $I_1$~$I_3$, transmission information delay circuits $D_1$~$D_3$, demultiplexers $DM_1$~$DM_3$, tag information decoding circuits $DEC_1$~$DEC_3$, which construct a cell distribution unit CELD, buffer memories such as FIFO (first-in, first-out) memories $FM_{11}$~$FM_{33}$, selectors $SEL_1$~$SEL_3$, and arrival order management FIFOs $AOM_1$~$AOM_3$. Each arrival order management FIFO ($AOM_1$~$AOM_3$) is connected to the output terminals of the information decoding circuits $DEC_1$~$DEC_3$ and stores the order in which cells arrive at the corresponding three buffer memories $FM_{11}$~$FM_{13}$, $FM_{21}$~$FM_{23}$, $FM_{31}$~$FM_{33}$. These FIFOs control the corresponding selectors $SEL_1$~$SEL_3$ so that cells are read out of the three buffer memories in the order of cell arrival and sent to outgoing lines #1~#3.

The detection circuits $I_i$ (i=1~3) extract the tag information contained in the input signal and send the information to the decoder circuits $D_i$ (i=1~3). If the entering tag information TAG indicates the output terminal #j (j=1~3), the decoder circuit $DEC_i$ operates the demultiplexer $DM_i$ by a changeover signal $S_i$ to send the cell to the FIFO memory $FM_{ji}$. For example, if the tag information contained in the cell which has entered from the input terminal #1 indicates output terminal #2, the decoder circuit $DEC_1$ operates the demultiplexer $DM_1$ so that the information from the input terminal #1 enters FIFO $FM_{21}$. The arrival order management FIFO ($AOM_i$) is connected to the output terminals of the tag information decoding circuits $DEC_1$~$DEC_3$ and stores the order in which cells arrive at the corresponding three buffer memories $FM_{i1}$~$FM_{i3}$. For example, if cells arrive in the order of buffer memory $FM_{11}$→$FM_{12}$→$FM_{13}$→$FM_{12}$→ . . . , buffer memory identification codes are stored in the arrival order management FIFO ($AOM_1$) in the order of cell arrival, i.e., in the manner 1→2→3→2→ . . . . Thereafter, the arrival order management FIFO ($AOM_i$) controls the corresponding selector $SEL_i$ so that cells are read out of the three buffer memories $FMi_1$~$FMi_3$ in the order of cell arrival and sent to the outgoing line #i.

A buffer function is thus obtained by providing the FIFO memory $FM_{ij}$ with a capacity equivalent to a plurality of cells. This makes it possible to deal satisfactorily with a case in which there is a temporary increase in transmission data. Further, since cells are read out of the buffer memories $FM_{i1}$~$FM_{i3}$ in the order of cell arrival, equal numbers of cells reside in the buffer memories $FM_{i1}$~$FM_{i3}$. This makes it possible to reduce situations (cell loss ratio) in which cells are discarded owing to overflow of the buffer memories.

Thus, in order to accommodate a variety of burst connections in the same ATM exchange, a method of allocating resources exploiting traffic characteristics is vital in order to make effective utilization of line resources. This means that a function for acquiring NDC and PM traffic data is necessary in order to ascertain the traffic characteristics.

The NDC data includes (1) the number of input cells or the number of output cells for each interface and for each virtual connection, and (2) the number of discarded input cells per virtual connection based upon UPC (usage parameter control) or the number of discarded input cells of CLP=0 (cell loss priority=0). The PM (performance monitoring parameter) data includes (1) the number of error cells, (2) the number of lost user information cells, and (3) the number of mis-inserted user information cells). These items of traffic data are collected at 15-minute intervals or at an interval of once per day. If a threshold value is exceeded, a TCA (threshold crossing alert) is issued.

In the prior art, the ATM exchange is provided with one processor and the processor executes the entirety of the call processing control, traffic data acquisition, editing processing and billing processing. As a consequence, it is required that an enormous amount of traffic data be collected and edited periodically. This places a large load upon the processor and delays call processing service. In particular, the larger the number of subscribers accommodated by the ATM exchange, the more pronounced these problems become. Consequently, high-speed call processing and other services cannot be provided.

SUMMARY OF THE INVENTION

Accordingly, an object of the present invention is to provide an ATM exchange so adapted that the load on the processor can be reduced to make possible the provision of a high-speed call processing service and other services.

A second object of the present invention is to provide an ATM exchange furnished with a call processor and a traffic processor, with call processing and processing for collecting and editing traffic data being split between these processors to reduce the load upon the call processor.

A third object of the present invention is to provide an ATM exchange in which it is possible to cope simply with a large number of subscribers to the ATM exchange in such a manner that the burden upon the call processor is alleviated.

A fourth object of the present invention is to provide an ATM exchange in which the acquisition and editing of traffic data and billing data can be performed without placing a load upon the call processor.

According to the present invention, the foregoing objects are obtained by providing an ATM exchange comprising an ATM switch for switching a cell, which has arrived from a prescribed incoming line and has a header, to a prescribed outgoing line based upon a VPI/VCI contained in the header of the cell, a call processor for executing call processing control based upon a connect/disconnect request, and a traffic processor for collecting traffic data in a subscriber line connected to the subscriber via a user network interface (UNI) or traffic data in a transmission line connected to a network via a network node interface (NNI).

Further, according to the present invention, the foregoing objects are obtained by providing an ATM exchange comprising an ATM switch for switching an input cell to a prescribed outgoing line, a processor for executing call processing control based upon a connect/disconnect request, and a signaling device provided between the processor and the ATM switch for inputting a call processing cell that has entered, via the ATM switch, from a channel device provided in a subscriber line or in a transmission line, to the processor upon subjecting the call processing cell to prescribed processing, a PVC (permanent virtual channel) connection being established between each channel device and a maintenance center, each channel device transferring a traffic-data notification cell to the maintenance center by utilizing the PVC connection, and the maintenance center collecting and editing the traffic data.

Further, according to the present invention, the foregoing objects are obtained by providing an ATM exchange comprising an ATM switch for switching an input cell to a prescribed outgoing line, a call processor for executing call processing control based upon a connect/disconnect request, a signaling device provided between the call processor and the ATM switch for inputting a call processing cell that has entered, via the ATM switch, from a channel device provided in a subscriber line or in a transmission line, to the processor upon subjecting the call processing cell to prescribed processing, a traffic-cell acquisition unit connected to the ATM switch, and a traffic primary storage unit for storing traffic data collected by the traffic-cell acquisition unit, the ATM switch outputting a call processing cell, which has entered from a channel device, to an outgoing line conforming to the signaling device upon referring to a VPI/VCI that has been added to the call processing cell, and outputting the traffic-data notification cell, which has entered from a channel device, to an outgoing line conforming to the traffic-cell acquisition unit upon referring to a VPI/VCI that has been added to the traffic-data notification cell.

Other features and advantages of the present invention will be apparent from the following description taken in conjunction with the accompanying drawings.

BRIEF DESCRIPTION OF THE DRAWINGS

FIG. 3 is a diagram for describing a routing table;

DESCRIPTION OF THE PREFERRED EMBODIMENTS (A) Overview of the present invention

As shown in FIG. 1, numeral 11 denotes an ATM switch for switching a cell, which has arrived from a prescribed incoming line, to a prescribed outgoing line based upon a VPI/VCI contained in the header of the cell. Channel devices (subscriber line interfaces) 12a~12n are connected to respective subscriber terminals via respective user network interfaces UNI. Channel devices (trunk circuits) 13a~13n are connected to a network via respective network node interfaces NNI. A call processor 14 executes call processing control based upon a call connect/disconnect request, and a traffic processor 15 collects traffic data from subscriber lines or transmission lines.

Figure 1:
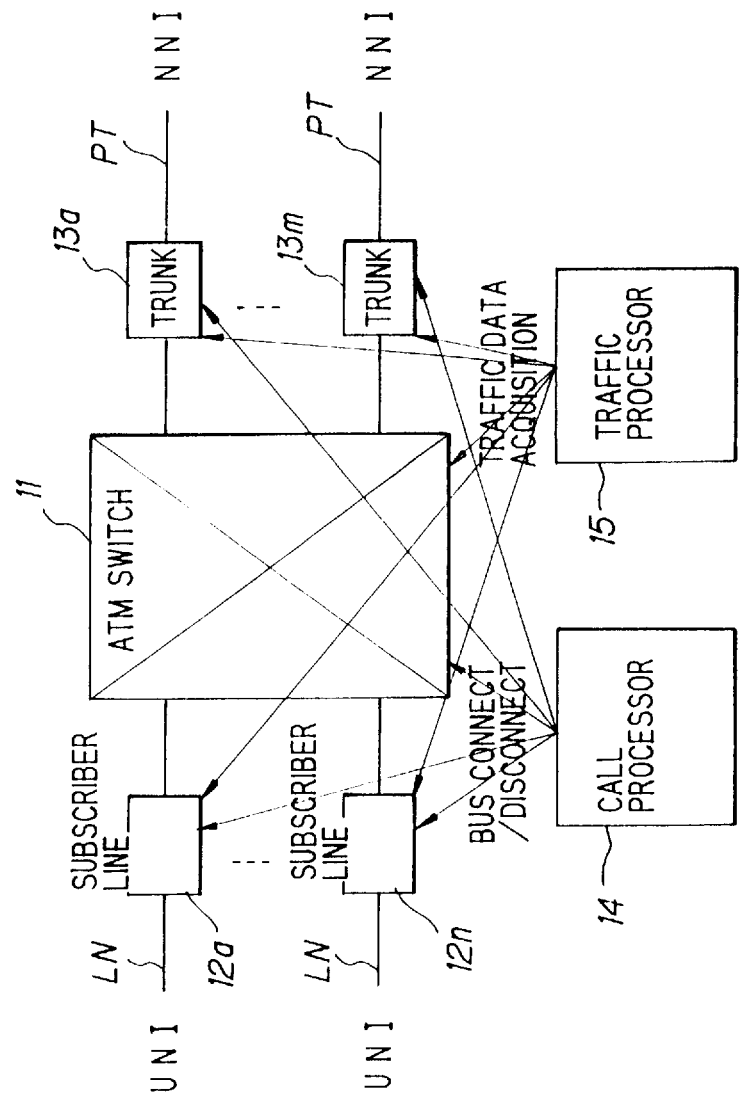
FIG. 1 is a block diagram for describing the principles of the present invention.

An ATM exchange having the ATM switch 11 for switching the cell, which has arrived from the prescribed incoming line, to the prescribed outgoing line based upon the VPI/VCI contained in the header of the cell is provided with the call processor 14 for executing call processing and with the traffic processor 15 for collecting traffic data. The call processor 14 executes call processing control based upon a call connect/disconnect request, and the traffic processor 15 collects traffic data from subscriber lines LN or transmission lines PT. Thus, an arrangement is adopted in which the ATM exchange is provided with a call processor and a traffic processor so that call processing and processing for traffic data acquisition and editing can be split between the two processors. As a result, the load upon call processor can be reduced and it is possible to collect and edit traffic data or billing data without subjecting the call processor to a load.

Further, in a case where a large number of subscribers are accommodated by the ATM exchange, two or more traffic processors may be provided to disperse the traffic data acquisition and editing processing. If this arrangement is adopted, the load upon each processor can be mitigated and processing can be executed with sufficient margin.

Furthermore, first signaling devices for signal processing are provided between the ATM switch and the call processor, second signaling devices for signal processing are provided between the ATM switch and the traffic processor, and cells for call processing and cells for notification/collection of traffic data are sent and received between each channel device and the call processor and traffic processor via the first and second signaling devices and the ATM switch. If this arrangement is adopted, communication can be performed between each channel device and each processor in a cell format. As a result, the channel devices can execute call processing as well as traffic-data acquisition and editing processing even at locations far from the ATM exchange. For example, the traffic processor 15 sends cells for traffic data collection to each of the channel devices 12a~12n, 13a~13n via the second signaling devices and the ATM switch 11 at a prescribed period. In accordance with a request for traffic data, each channel device generates a traffic-data notification cell, which includes the traffic data of the subscriber line and transmission line, and communicates the cell to the traffic processor 15 via the ATM switch and second signaling device.

Further, the call processor 14 and the traffic processor 15 are connected so as to be capable of communicating with each other. When the call processor 14 notifies the traffic processor 15 of call connect, the call processor 14 edits billing data at prescribed times. When the call processor 14 notifies the traffic processor 15 of call disconnect, the call processor 14 collects billing data from a channel device. If this arrangement is adopted, the collection of the billing data is carried out by the traffic processor so that the load upon the call processor can be reduced further.

Furthermore, the channel devices 12a~12n provided in the subscriber lines, the channel devices 13a~13m provided in the transmission lines, the call processor 14 and the traffic processor 15 are interconnected by a bus so as to be capable of communication, and call processing data or traffic data is sent and received between the channel devices and each processor via the bus line. If this arrangement is adopted, the call processing data and traffic data can be sent and received between the channel devices and each processor via the bus line even if the first and second signaling devices are not provided.

Further, in accordance with the present invention, the call processor and traffic processor are not both provided. Instead, one processor for performing call processing and traffic data acquisition processing is provided, and signaling devices for subjecting a call processing cell and a traffic-data acquisition cell to prescribed signal processing are provided between the processor and the ATM switch. It is so arranged that the call processing cell and traffic-data notification/acquisition cell are sent and received between each channel device and the processor via the signaling devices and ATM switch. If this arrangement is adopted, a small-size ATM exchange can be constructed. Moreover, in a case where the ATM exchange accommodates a large number of subscribers, a traffic processor and the second signaling devices are connected to the ATM exchange, thereby making it possible to readily deal with these subscribers.

Further, an arrangement can be adopted in which the processor is made the call processor, a PVC (permanent virtual channel) connection is established between each channel device and a maintenance center, each channel device directly transfers a traffic-data notification cell to the maintenance center by utilizing the PVC connection, and the maintenance center collects and edits the traffic data. This arrangement also makes it possible to reduced the load on the processor.

Furthermore, the processor is made the call processor and a traffic-cell acquisition unit is connected to the ATM switch. The ATM switch sends a call processing cell, which has entered from a channel device, to the call processor via a signaling device upon referring to the VPI/VCI that has been added to the call processing cell, and transfers the traffic-data notification cell, which has entered from a channel device, to the traffic-cell acquisition unit upon referring to the VPI/VCI that has been added to the traffic-data notification cell. The load upon the processor can be reduced even if this arrangement is adopted.

(B) First embodiment of the invention
  (a) Overall configuration

Figure 2:
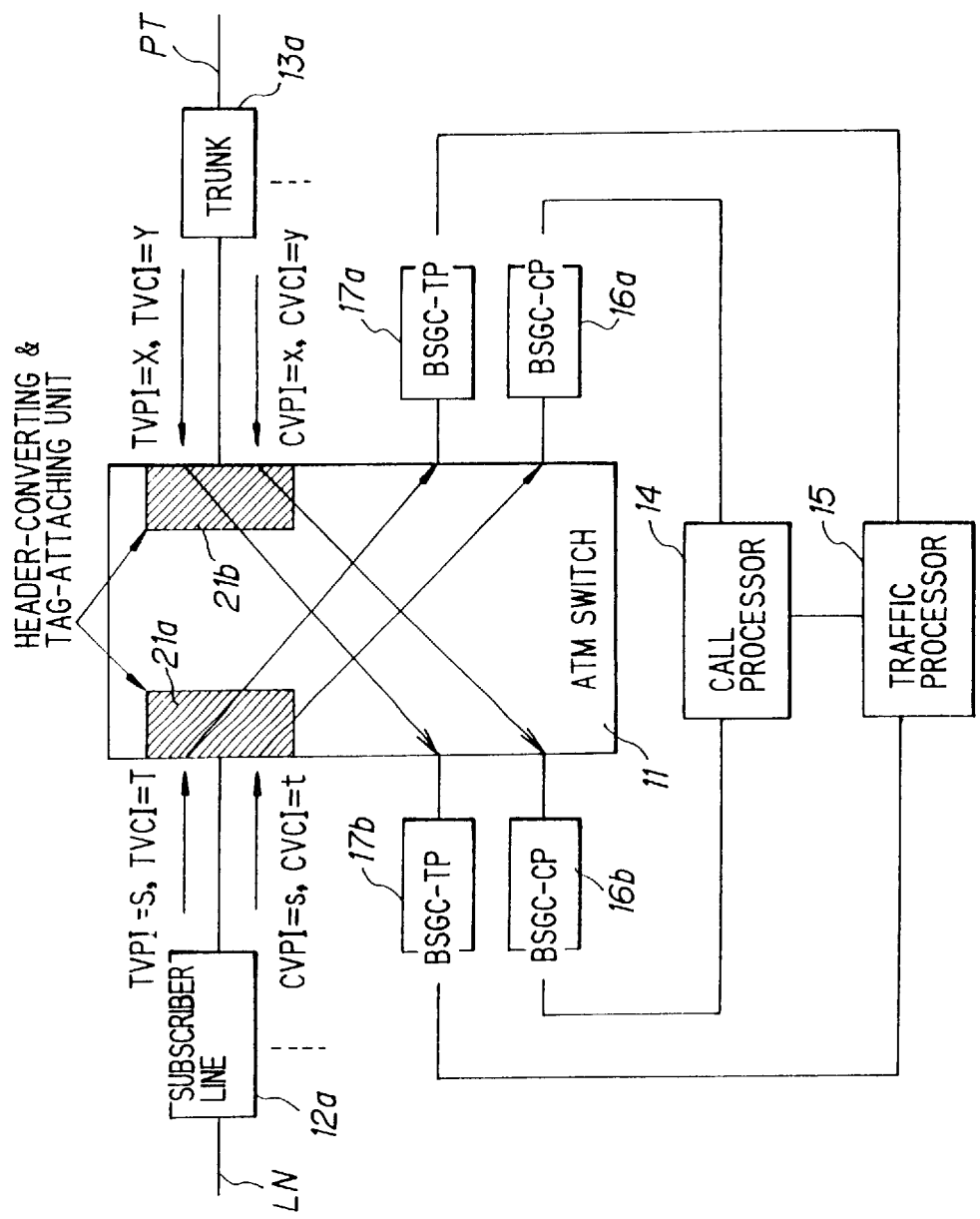
FIG. 2 is a block diagram illustrating the configuration of a first embodiment of the present invention.

FIG. 2 is a block diagram illustrating the configuration of a first embodiment of the present invention. As shown in FIG. 2, the ATM switch 11 switches a cell, which has arrived from a prescribed incoming line, to a prescribed outgoing line based upon a VPI/VCI contained in the header of the cell. The subscriber line interfaces 12a . . . are connected to respective subscriber terminals via the respective user network interfaces UNI. The trunk circuits 13a . . . are connected to a network via respective network node interfaces NNI. The call processor 14 executes call processing control based upon a call connect/disconnect request, and the traffic processor 15 collects traffic data on subscriber lines LN and transmission lines PT. The call processor 14 and traffic processor 15 are connected so as to be capable of communicating with each other.

First signaling devices (BSGC-CP) 16a, 16b are each provided between the call processor 14 and the ATM switch 11 and function to (1) disassemble call processing cells, which have entered via the ATM switch 11 from the channel devices (subscriber line interfaces and trunks) 12a, 13a provided in the subscriber lines LN and transmission lines PT, into data capable of being handled by the processor, and enter the data into the call processor 14, and (2) assemble data from the call processor 14 into a cell and send the cell to the prescribed channel device via the ATM switch 11.

Second signaling devices (BSGC-TP) 17a, 17b are each provided between the traffic processor 15 and the ATM switch 11 and function to (1) disassemble traffic-data notification cells, which have entered via the ATM switch 11 from the channel devices 12a, 13a, into data capable of being handled by the processor, and enter the data into the traffic processor 15, and (2) assemble data from the traffic processor 15 into a traffic-data acquisition cell and send the cell to the prescribed channel device via the ATM switch 11.

(b) Header-converting and tag-attaching unit

Figure 21:
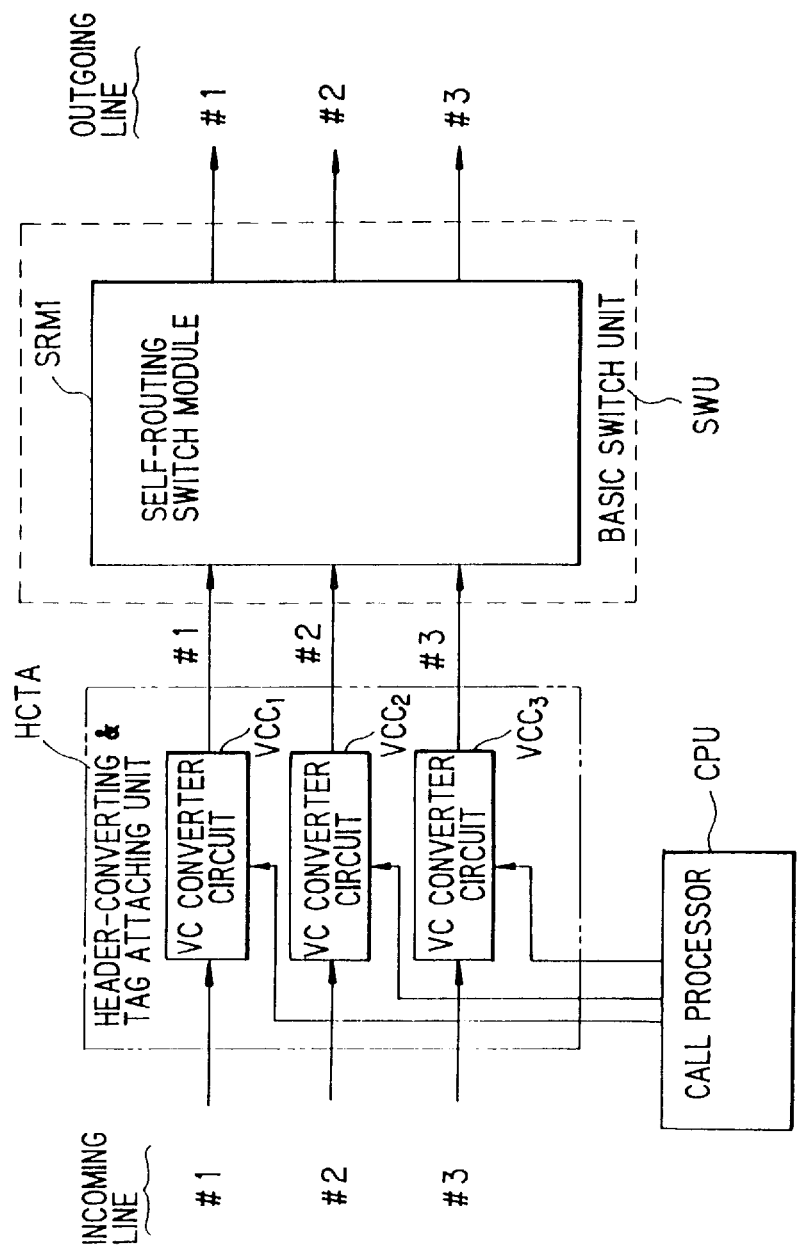
FIG. 21 is a block diagram illustrating the configuration of a self-routing ATM network.
Figure 22:
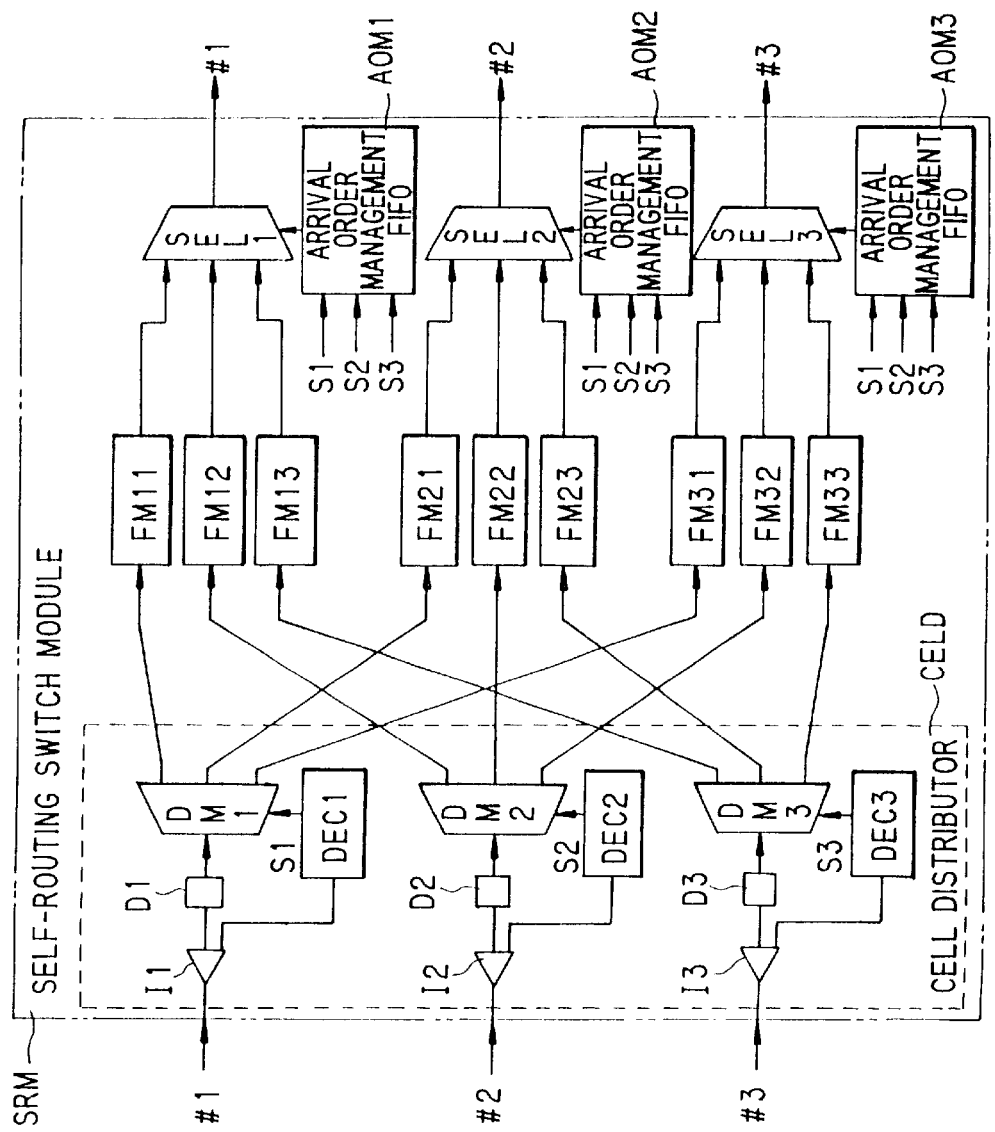
FIG. 22 is a diagram showing the construction of a self-routing switch module.

The ATM switch 11 is provided with header-converting and tag-attaching units 21a, 21b, each of which is equipped with VC converter circuits, which have an internal routing table, corresponding to the respective incoming lines, as described above in connection with FIG. 21. Each VC converter circuit refers to the routing table to replace the VPI/VCI of an input cell, adds tag information onto the cell and then enters the cell into the ATM switch 11.

As for the values of the VPI/VCI which each channel device (subscriber line interface and trunk) adds onto the signal cell (call processing cell) sent to the call processor 14 at the time of call connect/disconnect, values which differ for each channel device are given in advance at the time of subscription or when a path is connected. For example, "s", "t" are applied to the subscriber line interface 12a as the VPI, VCI (CVPI, CVCI) appended to a call processing cell. Further, "x", "y" are applied to the trunk 13a as the VPI, VCI (CVPI, CVCI) appended to the call processing cell.

Similarly, with regard to the values of the VPI/VCI. which each channel device (subscriber line interface and trunk) adds onto the cell (traffic-data notification cell) for notifying the traffic processor 15 of traffic data and the like, values which differ for each channel device are given in advance at the time of subscription or when a path is connected. For example, "S", "T" are applied to the subscriber line interface 12a as the VPI, VCI (TVPI, TVCI) appended to a traffic-data notification cell. Further, "X", "Y" are applied to the trunk 13a as the VPI, VCI (TVPI, TVCI) appended to the traffic-data notification cell.

Accordingly, as shown in FIG. 3, (1) tag information for routing a call processing cell to the first signaling devices 16a, 16b and (2) a new VPI/VCI to replace the old are stored, in correspondence with the CVPI/CVCI appended to the call processing cell, in the routing table of the VC converter circuit corresponding to each incoming line. Similarly, (1) tag information for routing a traffic-data notification cell to the second signaling devices 17a, 17b and (2) a new VPI/VCI to replace the old are stored, in correspondence with the TVPI/TVCI appended to the traffic-data notification cell, in the routing table of the VC converter circuit corresponding to each incoming line.

(c) Construction of signaling device

Figure 4:
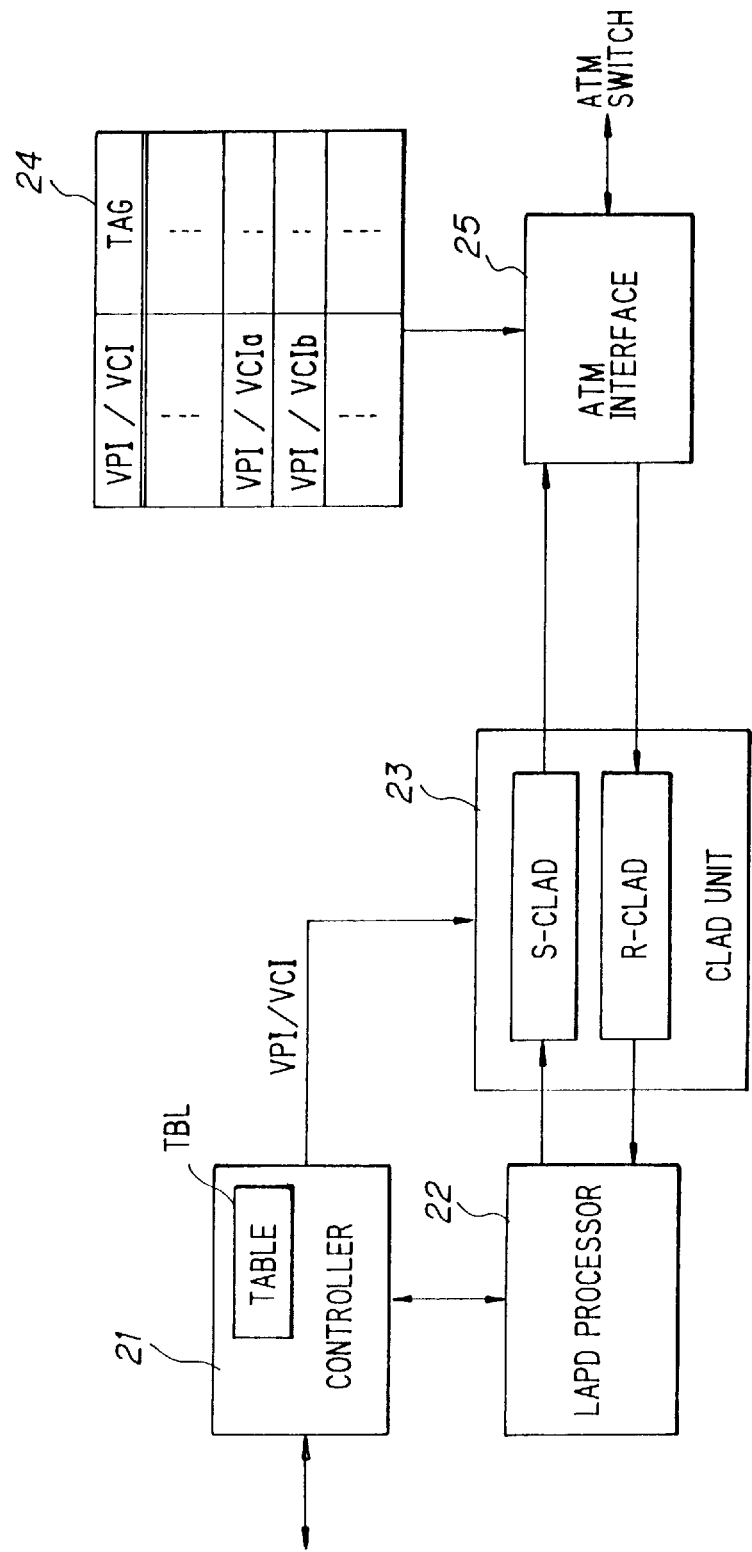
FIG. 4 is a diagram showing the construction of a signaling device.

FIG. 4 is a diagram showing the construction of a signaling device. The first and second signaling devices 16a, 16b and 17a, 17b, respectively, are identical in construction.

The signaling device includes a controller 21, an LAPD processor 22 for subjecting the information from the processor to layer-2 processing and then transmitting the processed information, a CLAD (cell assembly and disassembly) circuit 23 for disassembling a cell into data having a format capable of being handled by the processor and assembling data from a processor into a cell, a routing table 24 and an ATM interface circuit 25 for executing processing to replace the VPI/VCI of a cell that has entered from the CLAD circuit and add tag information onto the cell, and for removing tag information from a cell that has entered from the ATM switch 11. The controller 21 is provided with a table TBL for storing the corresponding relationship between the channel devices 12a, 13a, . . . that are the destinations of data transfer and the VPI/VCIs of these channel devices. The CLAD circuit 23 is provided with a sending CLAD unit S-CLAD for assembling data, which has entered from the processor (call processor or traffic processor) into a cell and adding a VPI/VCI, which conforms to the channel device at the transfer destination, onto each cell, and a receiving CLAD unit R-CLAD for disassembling a cell, which has entered from the ATM interface circuit 25, according to each VPI/VCI and outputting the resulting data. Registered in the routing table 24, in correspondence with the VPI/VCI of each channel device, is tag information for routing a cell to the channel device.

(d) Initial setting of routing table

It is required that the following be initially set in the routing table corresponding to each incoming line of the header-converting and tag-attaching units 21a, 21b: (1) tag information for routing a call processing cell, which has been sent from a channel device, to the first signaling devices 16a, 16b, and a new VPI/VCI to replace the old, these being set in correspondence with the VPI/VCI of the call processing cell, and (2) tag information for routing a traffic-data notification cell, which has been sent from a channel device, to the second signaling devices 17a, 17b, and a new VPI/VCI to replace the old, these being set in correspondence with the VPI/VCI of the traffic-data notification cell.

Further, it is required that the routing table 24 (FIG. 4) of each of the signaling devices 16a~17a be initially set with tag information in correspondence with the VPI/VCI of each channel device, wherein the tag information is for routing a cell to the channel device.

Figure 5:
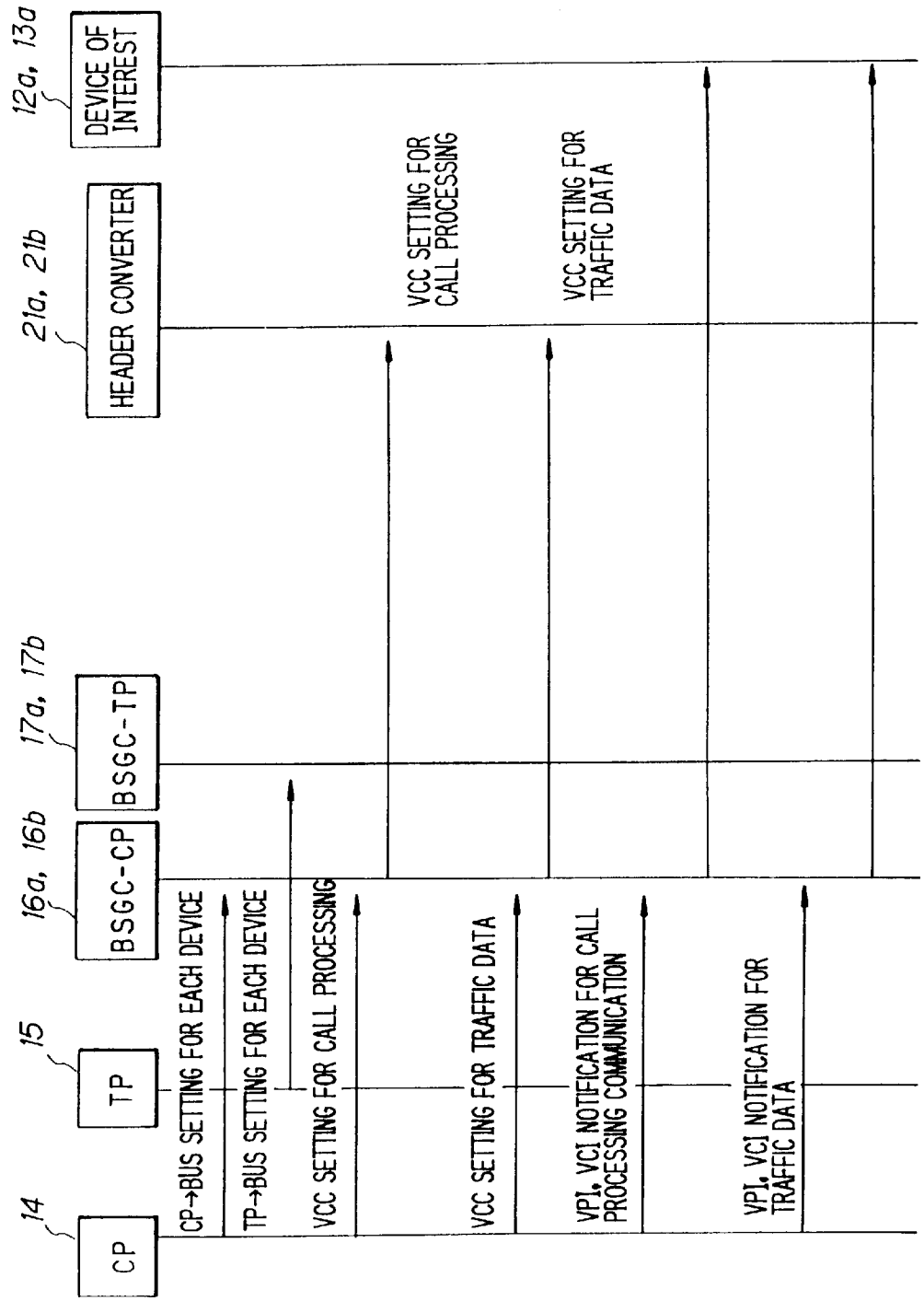
FIG. 5 is a diagram for describing a procedure for initially setting the routing table.

The processors 14, 15, header-converting and tag attaching units 21a, 21b and the signaling devices 16a~17a are interconnected by a bus (not shown). Accordingly, by way of the bus line, the call processor 14 initially sets the information of the portion of the routing table concerning to call processing and the traffic processor 15 initially sets the portion of the routing table concerning traffic processing. FIG. 5 is a diagram for describing a sequence through which such initial setting of the routing table is carried out.

Path setting

At initial setting of the hardware, the call processor 14 initially sets, for each channel device, the VPI/VCI and tag information of the call processing communication cell in the routing table 24 (FIG. 4) of the first signaling devices 16a, 16b. Further, the traffic processor 15 sets, for each channel device, the VPI/VCI and tag information of the traffic-data acquisition cell in the routing table 24 of the second signaling devices 17a, 17b.

VCC setting for call processing

Next, the call processor 14 sets the following in the routing table corresponding to each incoming line of the header-converting and tag-attaching units 21a, 21b: (1) tag information for routing a call processing cell, which has been outputted by a channel device, to the first signaling devices 16a, 16b, and (2) a new VPI/VCI to replace the old, (1) and (2) being set in correspondence with the VCI of the call processing cell.

VCC setting for traffic data:

Next, the traffic processor 15 sets the following in the routing table corresponding to each incoming line of the header-converting and tag-attaching units 21a, 21b: (1) tag information for routing a traffic-data notification cell, which has been outputted by a channel device, to the second signaling devices 17a, 17b, and (2) a new VPI/VCI to replace the old, (1) and (2) being set in correspondence with the VCI of the call processing cell.

Thereafter, the call processor 14 notifies each of the channel devices 12a, 13a . . . of the VPI/VCI of the call-processing notification cell via the first signaling devices 16a, 16b, and the traffic processor 15 notifies each of the channel devices 12a, 13a . . . of the VPI/VCI of the traffic-data acquisition cell via the second signaling devices 17a, 17b. This ends the initial settings.

(e) Construction of subscriber line interface

Figure 6:
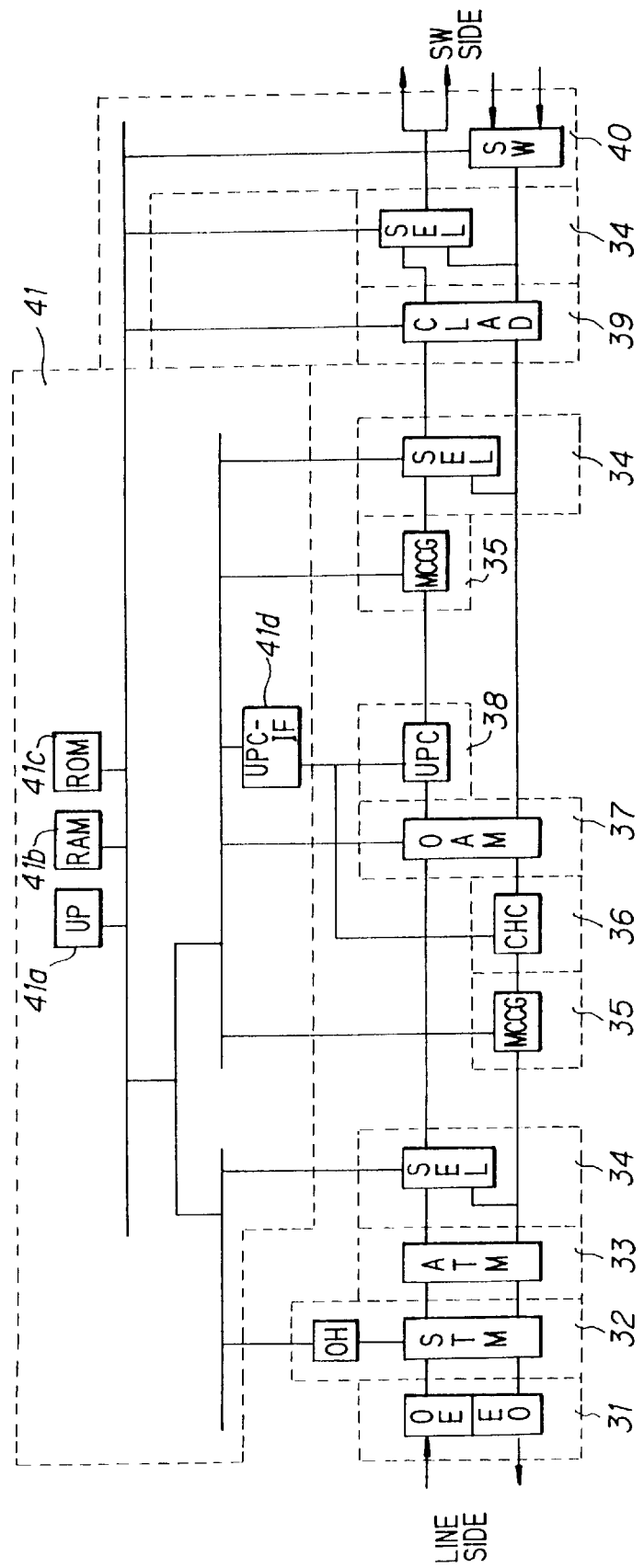
FIG. 6 is a block diagram showing the construction of a subscriber line interface.

FIG. 6 is a block diagram showing the construction of the subscriber line interface 12a. Numeral 31 denotes an optical interface unit connected to a subscriber line constituted by an optical fiber. The unit 31 has an electro-optical converter circuit (O/E) and an electro-optical converter circuit (E/O). Numeral 32 denotes a physical layer terminating unit (STM) that controls the electrical level, 33 an ATM layer terminating circuit (ATM) that disassembles cells and creates cells, and 34 a test-cell loop-back unit (SEL) which, in order to test each component of the subscriber line interface, loops a test cell, which is sent from the side of the ATM switch, back to the side of the ATM switch. Numeral 35 designates an ATM layer-performance management unit (MCCG) for managing the degree of decline in the performance of the subscriber line. This unit collects PM data such as (1) the number of error cells, (2) the number of lost user information cells and (3) the number of misinserted user information cells.

Numeral 36 represents billing processor (CHC) and 37 an ATM layer alert monitor (OAM). The latter executes processing for inserting and extracting an OAM (operation and maintenance) cell for maintenance management. Numeral 38 denotes a UPC/NPC processor (UPC) for collecting NDC data such as (1) the number of input cells or number of output cells per interface and per virtual connection, and (2) the number of discarded input cells or number of discarded CLP=0 input cells per virtual connection based upon UPC/NPC control. Numeral 39 denotes a local communication terminating unit (CLAD: cell assembly and disassembly) which functions to (1) extract and disassemble cells (call-processing communication cells and traffic-data acquisition cells) transferred from the processors 14, 15 via the signaling devices 16a, 16b and 17a, 17b, and (2) assemble a call connect/disconnect message and traffic data into cells and transmit the cells.

Numeral 40 represents an interface unit (SW) for interfacing the ATM switch. Numeral 41 denotes a control unit constituted by a microcomputer and having a microprocessor 41a, a RAM 41b, a ROM 41c and a UPC interface 41d, these being interconnected by a bus. The control unit 41 executes (1) loop-back control of test cells, (2) traffic control for collecting and giving notification of PM data, NDC data and traffic data such as billing information, (3) control for transmitting various messages at call connection and disconnection, and (4) alert monitoring control based upon OAM cells.

(f) Procedure for traffic-data acquisition processing

Figure 7:
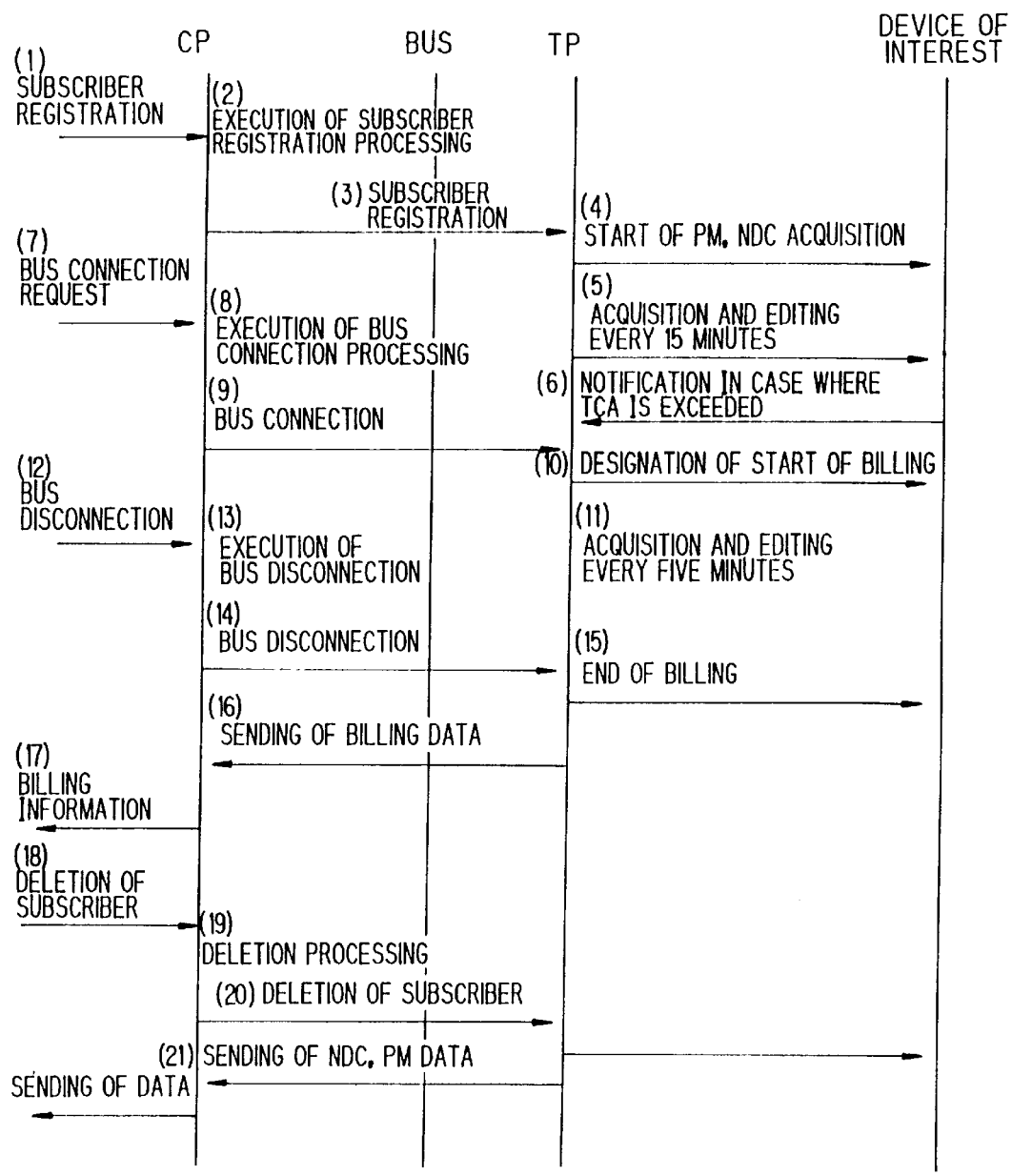
FIG. 7 is a diagram for describing a procedure for traffic-data acquisition processing.

FIG. 7 is a diagram for describing a procedure for traffic-data acquisition processing.

(1) When registration of a subscriber or connection registration of a transmission line is entered into the call processor 14 from a control panel or the like, not shown, (2) the call processor 14 executes subscriber registration processing and path-connection registration processing and (3) notifies the traffic processor 15 of the subscriber registration and path connection registration.

(4) The traffic processor 15 starts processing for acquiring NDC data and PM data with regard to all registered subscriber lines and transmission lines. (5) Specifically, the traffic processor 15 collects and edits data from each of the channel devices every 15 minutes or at intervals of one per day in conformity with each item of the traffic data.

The collection of the traffic data is carried out as follows: When a predetermined time arrives for acquisition of the traffic data, the traffic processor 15 enters data specifying a channel device, the category of data to be acquired and other data into the second signaling devices 17a, 17b. The second signaling devices 17a, 17b each obtain the VPI/VCI of a traffic-data acquisition cell, which corresponds to the designated channel device, from the table TBL (FIG. 4), assemble the entered data into a cell and attach the obtained VPI/VCI to the cell. Further, the second signaling devices 17a, 17b each obtain tag information, which is for routing the traffic-data acquisition cell to the designated channel device, from the routing table 24, attach the tag information to the cell and send the cell to the ATM switch 11. As a result, the traffic-data acquisition cell enters the designated channel device.

The local communication termination unit 39 (FIG. 6) of the channel device refers to the VPI/VCI of the traffic-data acquisition cell, extracts the cell, disassembles the cell into data and sends the data to the microcomputer 41a. The latter analyzes this data and enters the traffic data, which has been acquired by the ATM layer-performance management unit 35 and UPC/NPC processor 38, into the local communication termination unit 39. The latter assembles the entered traffic data into a cell, attaches the VPI/VCI for traffic data notification and sends the cell toward the ATM switch 11. The header-converting and tag-attaching units 21a, 21b replace the VPI/VCI of the entered traffic-data acquisition cell with another VPI/VCI stored in the routing table, attach tag information for routing the cell to the second signaling devices 17a, 17b and enter the cell into the ATM switch 11.

As a result, the traffic-data acquisition cells enter the second signaling devices 17a, 17b, which then remove the tag information from the cells, disassemble the cells and enter the traffic data obtained into the traffic processor 15. The latter collects and edits the traffic data. Thereafter, and in similar fashion, traffic data is acquired from the other channel devices as well.

(6) When a TCA (threshold crossing alert) notification indicating that the traffic data of a prescribed item has exceeded a threshold value is received from a channel device, the traffic processor requests this channel device for detailed notification of the traffic data and then performs collection and editing processing.

The aforementioned processing for collecting and editing traffic data is carried out at all times until the ATM exchange stops operating. The traffic processor 15 sends the acquired and edited traffic data to the maintenance center periodically or in response to a request.

As a result, the call processor is freed from processing for executing acquisition and editing of the traffic data and, hence, the load upon this processor is alleviated.

(7) When a path connection request is received from a channel device under these conditions, (8) the call processor 14 executes path connection processing. More specifically, when a subscriber places an outgoing call, the microcomputer of a channel device enters a SET-UP message into the local communication terminating unit 39 (FIG. 6). The latter assembles the entered data into a cell, attaches the call processing VPI/VCI and sends the cell toward the ATM switch 11. The header-converting and tag-attaching units 21a, 21b replace the entered call-processing VPI/VCI with another VPI/VCI stored in the routing table, attach tag information for routing the cell to the first signaling devices 16a, 16b and enter the cell into the ATM switch 11. As a result, the call processing cells enter the first signaling devices 16a, 16b, which then remove the tag information from the cells, disassemble the cells and enter the SET-UP message obtained into the call processor 14. The call processor 14 executes call processing. It should be noted that a call-processing communication cell sent from the call processor 14 to a channel device is communicated to the microcomputer 41a of the channel switch via the first signaling device→ATM switch→local communication terminating unit 39 just as in the case of the traffic-data acquisition cell.

(9) When a path is connected by call processing, the call processor 14 notifies the traffic processor 15 of path connection by communicating with this processor. (10) As a result, the traffic processor 15 instructs the notified channel device to start billing. The command to perform billing is accepted by the microcomputer 41a via the local communication terminating unit 39, and the microcomputer 41a instructs the billing processor 36 to begin billing. In response, the billing processor 36 starts counting for billing purposes (counting of the number of cells that pass by).

(11) The traffic processor 15 collects and edits billing data from each channel device at intervals of five minutes. Control for collecting the billing data is performed in the same manner as the processing for collecting the NDC and PM traffic data.

(12) When the call ends, the channel device sends the call processor 14 a processing cell for disconnecting the path, (13) the call processor executes call disconnect processing and (14) notifies the traffic processor 15 of path disconnect. (15) As a result, the traffic processor 15 notifies the channel device of the end of billing, collects billing data over a period less than the last five minutes and sums the billing data thus far. (16) Thereafter, the traffic processor 15 sends the billing data regarding the disconnected call to the call processor 14 and (17) the call processor 14 executes processing for calculating the bill. Thus, billing data can be acquired merely by having the call processor 14 notify the traffic processor 15 of the connection and disconnection of the call. This makes it possible to greatly reduce the burden of billing-data acquisition processing. It should be noted that the reason for collecting the billing data every five minutes is to prevent loss of billing data if the billing processor 36 should happen to fail during billing.

(18) In response to notification of deletion of a subscriber or deletion of a transmission line, (19) the call processor 14 executes subscriber deletion processing and (20) notifies the traffic processor 15 and channel device of subscriber deletion. (21) Next the traffic processor 15 transmits the NDC, PM data to the maintenance center via the call processor (or directly).

(C) Second embodiment of the invention

Figure 8:
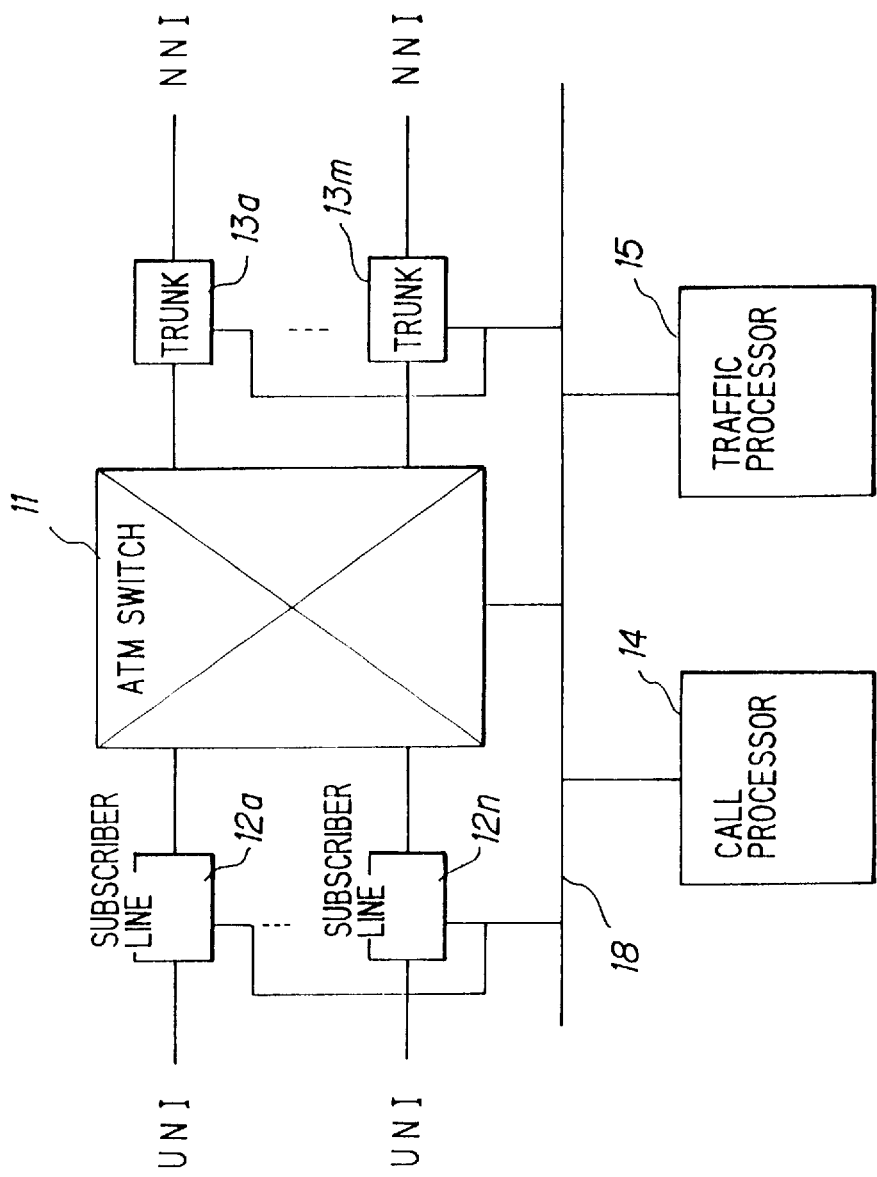
FIG. 8 is a block diagram illustrating the configuration of a second embodiment of the present invention.

FIG. 8 illustrates the configuration of an ATM exchange according to a second embodiment of the present invention. In the first embodiment, the channel devices send data to and receive data from each processor in a cell format via the ATM switch and signaling devices. In accordance with the first embodiment, no problems arise in terms of system architecture even if the channel devices are remote from the ATM exchange. However, the first and second signaling devices are necessary in such an arrangement.

The ATM exchange of the second embodiment does not require signaling devices. This arrangement is useful in a case where the channel devices are placed close to the ATM exchange.

Components in FIG. 8 identical with those of the first embodiment shown in FIG. 2 are designated by like reference characters. This embodiment includes the ATM switch 11 (in which the header-converting and tag-attaching units are not illustrated), the subscriber line interfaces 12a~12n, which are the channel devices on the subscriber side, the trunk circuits 13a~13m, which are the channel devices on the side of the transmission lines, the call processor 14, the traffic processor 15 and a data bus 18. The header-converting and tag-attaching units (not shown) of the ATM switch 11, the channel devices 12a~12n, 13a~13m, the call processor 14 and the traffic processor 15 are interconnected by the bus line 18 so as to be capable of sending and receiving data to and from one another.

Figure 9:
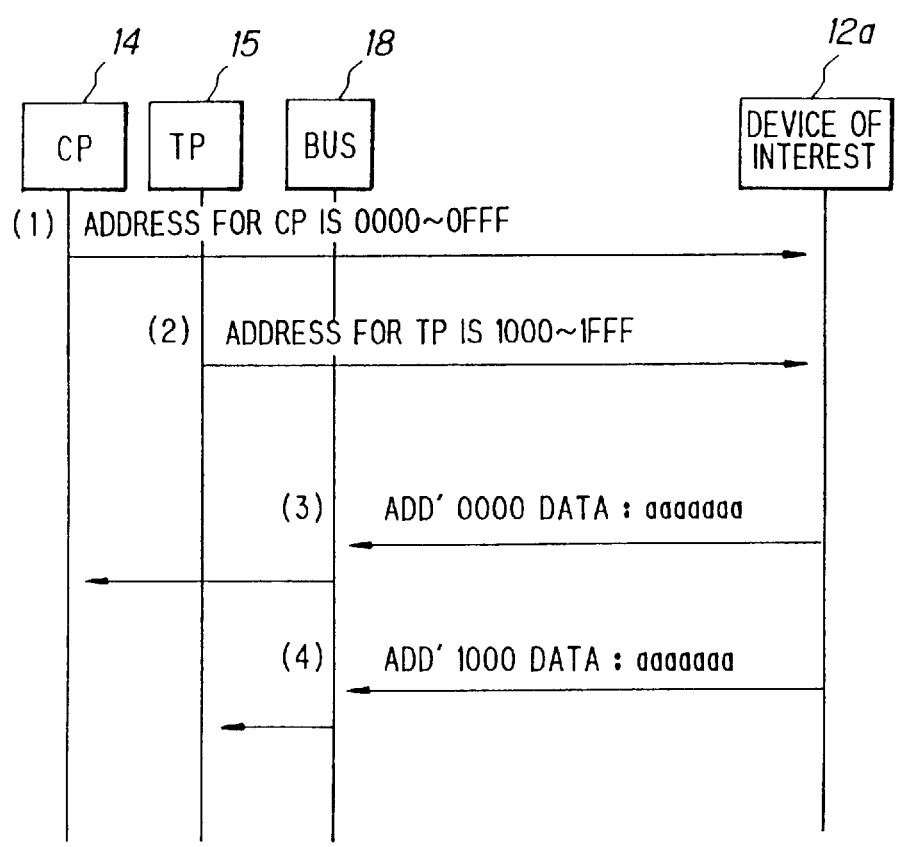
FIG. 9 shows a processing sequence according to the second embodiment.

FIG. 9 shows the processing sequence according to the second embodiment.

(1) Initially, the call processor 14 notifies each channel device of its own address by a multicast. (2) Next, the traffic processor 15 also gives notification of its own address by a multicast. (3) If, in a case where a channel device desires to transmit a call processing message to the call processor 14 under these conditions, the channel devices sends the bus a packet containing the address of the call processor serving as the destination, its own address serving as the source of the transmission and the message desired to be communicated, then the call processor 14 executes call processing upon receiving the packet. (4) If, in a case where a channel device desires to transmit traffic data to the traffic processor 15 under these conditions, the channel devices sends the bus a packet containing the address of the traffic processor 15 serving as the destination, its own address serving as the source of the transmission and the traffic data, then the traffic processor 15 executes processing for acquisition and editing of the traffic data upon receiving the packet.

In order for the call processor 14 and traffic processor 15 to send data to a prescribed channel device, it will suffice to include the address of the channel device serving as the destination, the address of the processor serving as the transmission source and the control data desired to be transmitted and send the result to the bus 18.

(D) Third embodiment of the invention

In a case where the ATM exchange accommodates a small number of subscribers, it is uneconomical to provide two processors, namely the call processor and traffic processor, as is done in the first embodiment. Accordingly, in a small-scale ATM exchange having a small number of subscribers, only one processor is provided and this processor is made to execute both call processing and traffic-data acquisition processing. When there is an increase in the number of subscribers and, hence, an increase in the load upon the single processor, the processing is dispersed by adding on a traffic processor. If this arrangement is adopted, the initial cost of the system can be reduced.

Figure 10:
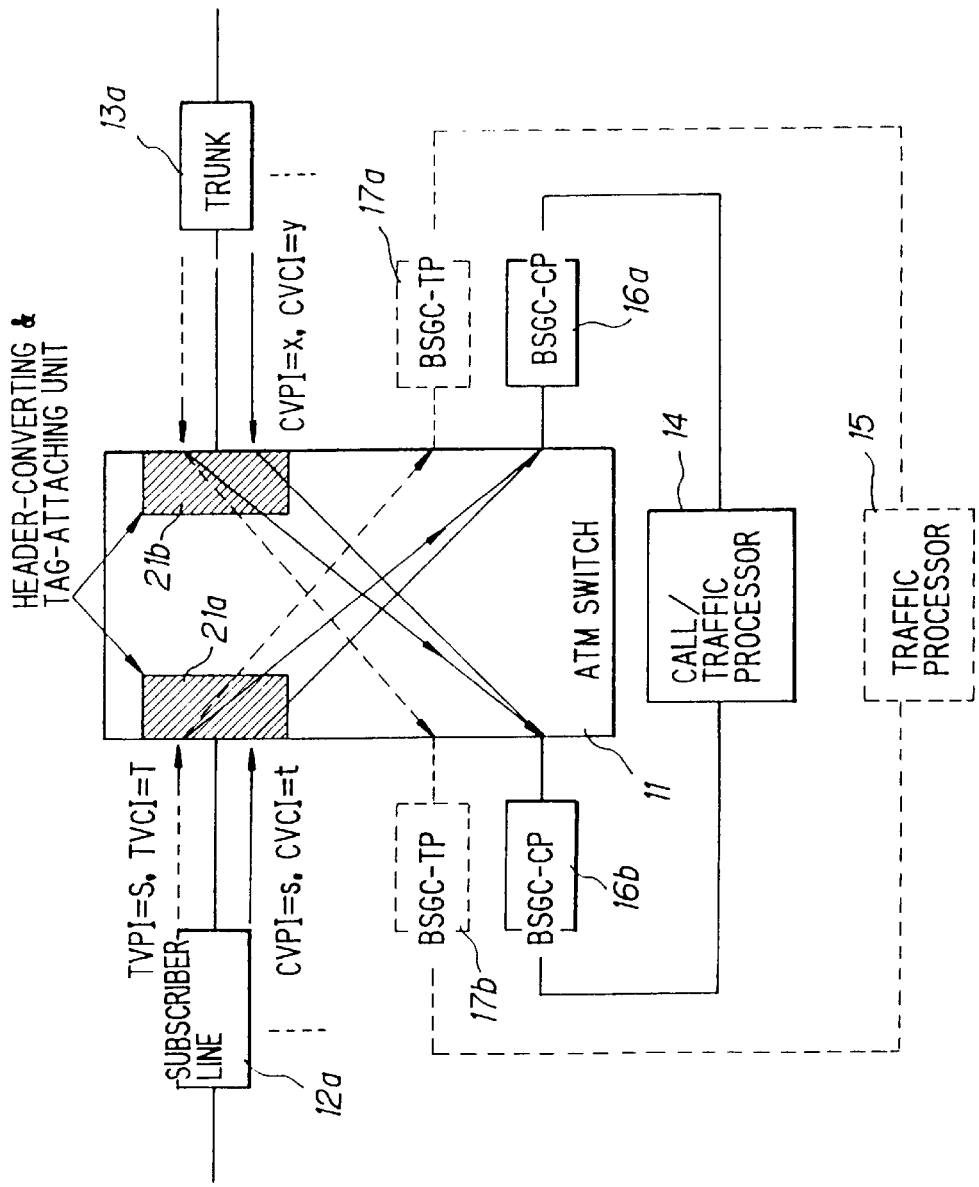
FIG. 10 is a block diagram illustrating the configuration of a third embodiment of the present invention.

FIG. 10 is a block diagram showing the configuration of the third embodiment of the invention. Components in FIG. 10 identical with those of the first embodiment shown in FIG. 2 are designated by like reference characters. The third embodiment differs from the second embodiment of FIG. 2 in the following respects:

(1) the traffic processor 15 and the second signaling devices 17a, 17b do not exist;

(2) the processor 14 executes both call processing and traffic processing; and (3) the VPI/VCI of the call processing cell and the VPI/VCI of the traffic-data notification cell are made identical values and both cells are sent to the processor 14.

In the third embodiment, the arrangement can readily be expanded to that of the first embodiment by adding on the traffic processor 15 and the second signaling devices 17a, 17b, as indicated by the dotted lines in FIG. 10, in response to an increase in the number subscribers. When the system is thus expanded, the VPI/VCI of the call processing cell and the VPI/VCI of the traffic-data notification cell would be made to differ, as in the manner of the first embodiment. The call processing cell would be sent to the call processor 14 and the traffic-data notification cell would be sent to the traffic processor 15.

(E) Fourth embodiment of the invention

Figure 11:
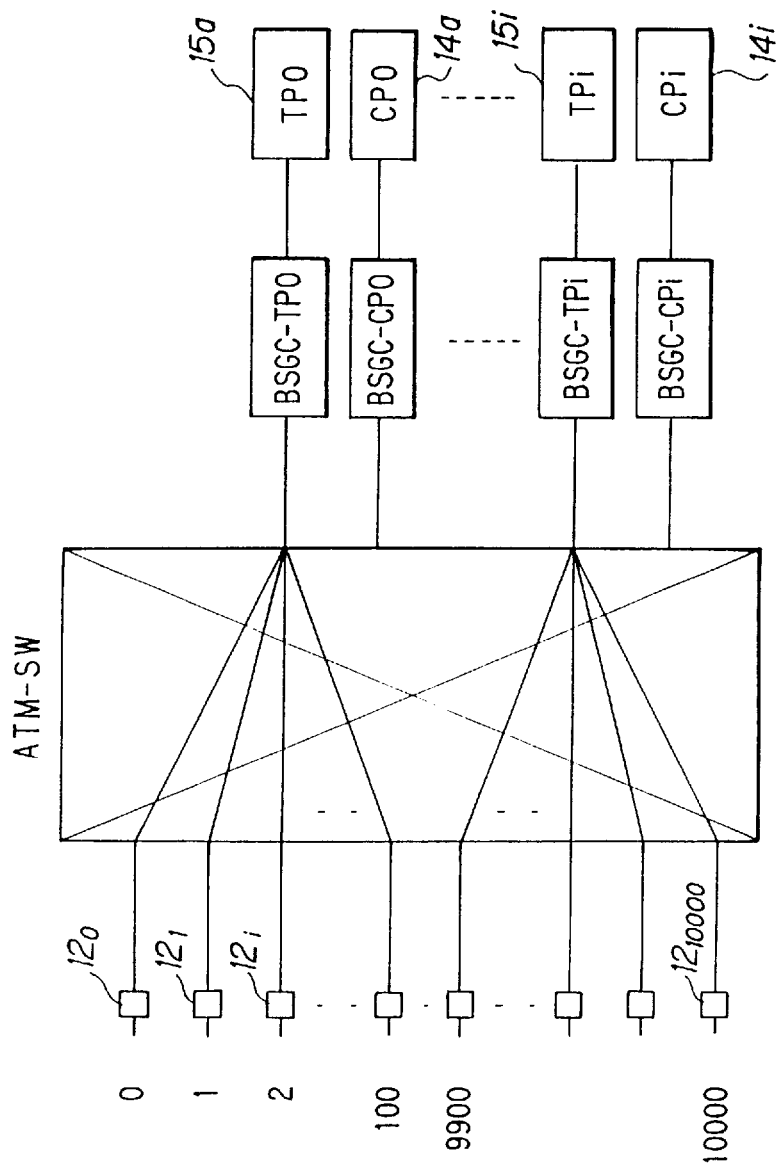
FIG. 11 is a block diagram illustrating the configuration of a fourth embodiment of the present invention.

FIG. 11 is a block diagram showing the fourth embodiment of the present invention. This embodiment is applicable to a case in which the ATM exchange accommodates a large number of subscribers and a large number of transmission lines. In the first embodiment, one call processor and one traffic processor are provided. However, when the ATM exchange accommodates a large number of subscribers and transmission lines, a single traffic processor is no longer capable of acquiring and editing the traffic data of all subscriber lines and transmission lines. In addition, a single call processor can no longer process calls from all subscribers. In the fourth embodiment, a plurality of call processors 14a~14i and a plurality of traffic processors 15a~15i are provided. Numeral 11 denotes the ATM switch and numerals $12_1$~$12_{10000}$ denote channel devices such as subscriber line interfaces and trunk circuits.

(F) Fifth embodiment of the invention

Figure 12:
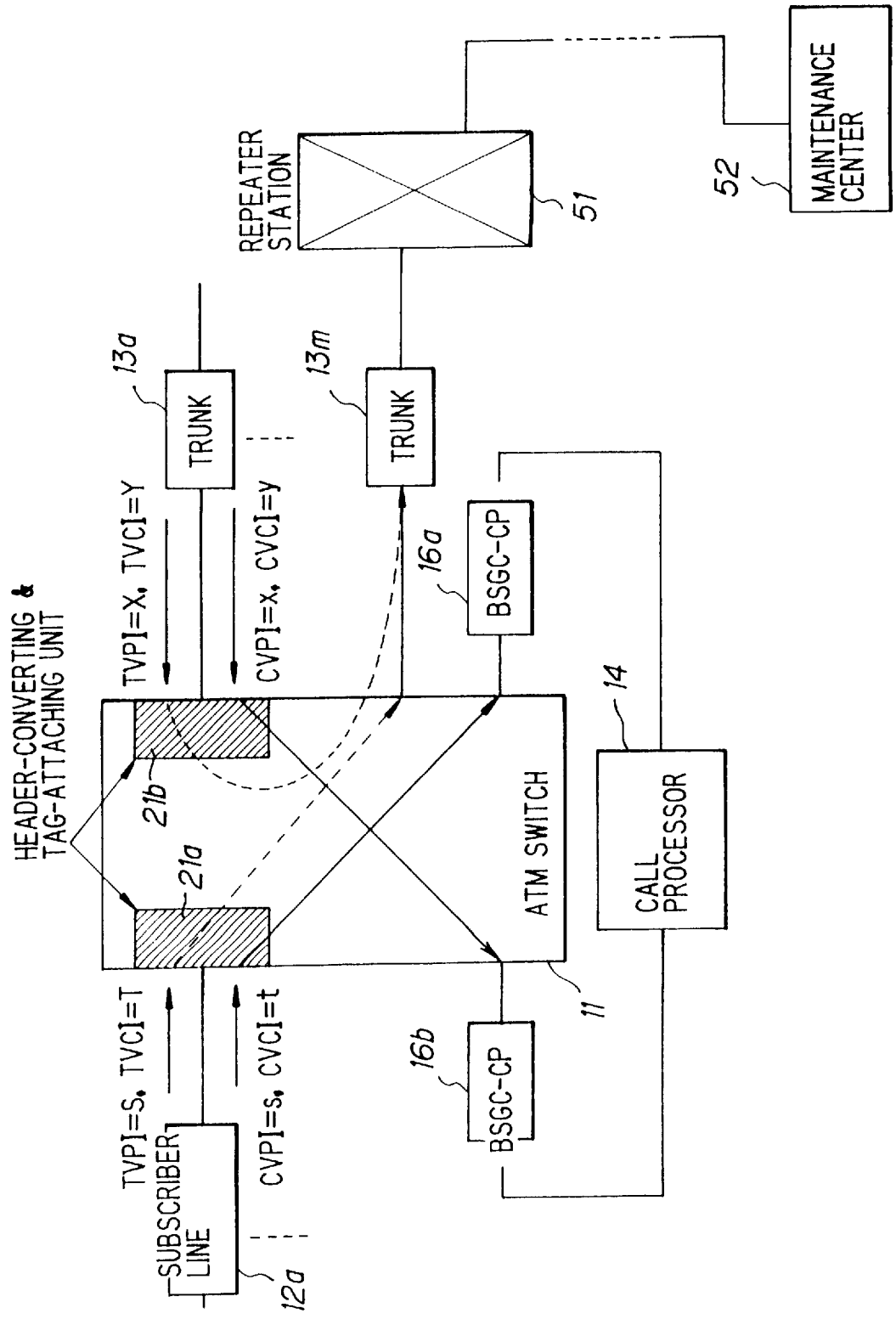
FIG. 12 is a block diagram illustrating the configuration of a fifth embodiment of the present invention.

FIG. 12 is a block diagram showing the fifth embodiment of the present invention. In the first embodiment, the traffic processor for collecting traffic data and the second signaling devices are provided. In the fifth embodiment, the traffic processor and second signaling devices are not provided and the traffic-data notification cell is sent directly to the maintenance center via the PVC (permanent virtual channel) connection.

Shown in FIG. 12 are the ATM switch 11 for switching an input cell to a prescribed outgoing line, the subscriber line interfaces 12a . . . , the trunk circuits 13a~13m, the call processor 14 for executing call processing control based upon a call connect/disconnect request, the signaling devices 16a, 16b provided between the call processor 14 and the ATM switch 11 for applying prescribed signal processing to a call processing cell that has entered from a channel device via the ATM switch and entering the processed signal to the call processor 14, the header-converting and tag-attaching units 21a, 21b, a repeater station 51 and a maintenance center 52 for collecting traffic data and billing data.

(1) A replacement VPI/VCI and (2) tag information for routing a call processing cell, which is sent from a channel device, to the outgoing lines conforming to the signaling devices 16a, 16b are initially set, in correspondence with the VPI/VCI of the call processing cell, in the routing table, corresponding to each incoming line, in the VC converter circuits 21a, 21b. Further, (1) a replacement VPI/VCI and (2) tag information for routing a traffic-data notification cell, which is sent from a channel device, to the outgoing line conforming to the maintenance center for traffic data acquisition are initially set, in correspondence with the VPI/VCI of the traffic-data notification cell, in each routing table. Furthermore, a PVC connection is established between each channel device and the maintenance center with regard to the traffic-data notification cell. Accordingly, if each channel device sends a traffic-data notification cell to the ATM switch 11, the cell is sent directly to the maintenance center 52 via the PVC connection.

Figure 13:
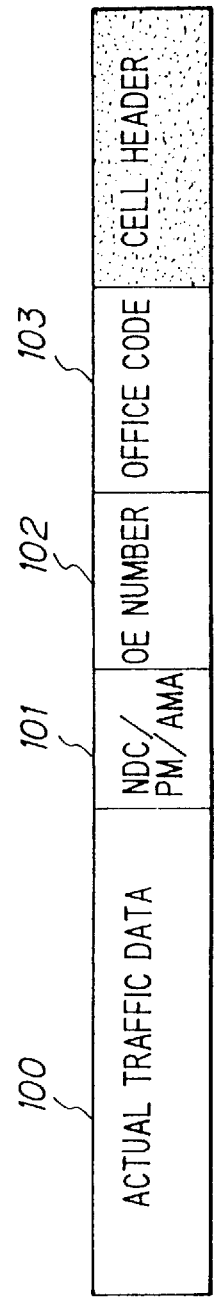
FIG. 13 is a diagram for describing composition of a traffic-data notification cell.

As shown in FIG. 13, the data field of the traffic-data notification cell includes actual traffic data 100, an indication 101 as to whether data is NDC data, PM data or billing data (AMA), a channel device number [OE (office equipment) number] 102 and an office code (the local number of the ATM exchange) 103.

The maintenance center 52 subjects received traffic data to data processing (by applying the data to a work station or large-scale computer) offline. Further, the items of billing data and PM data are communicated to the side of the call processor after editing and are utilized to calculate billing at the time of disconnection and to deal with malicious calls.

(G) Sixth embodiment (a) Configuration

Figure 14:
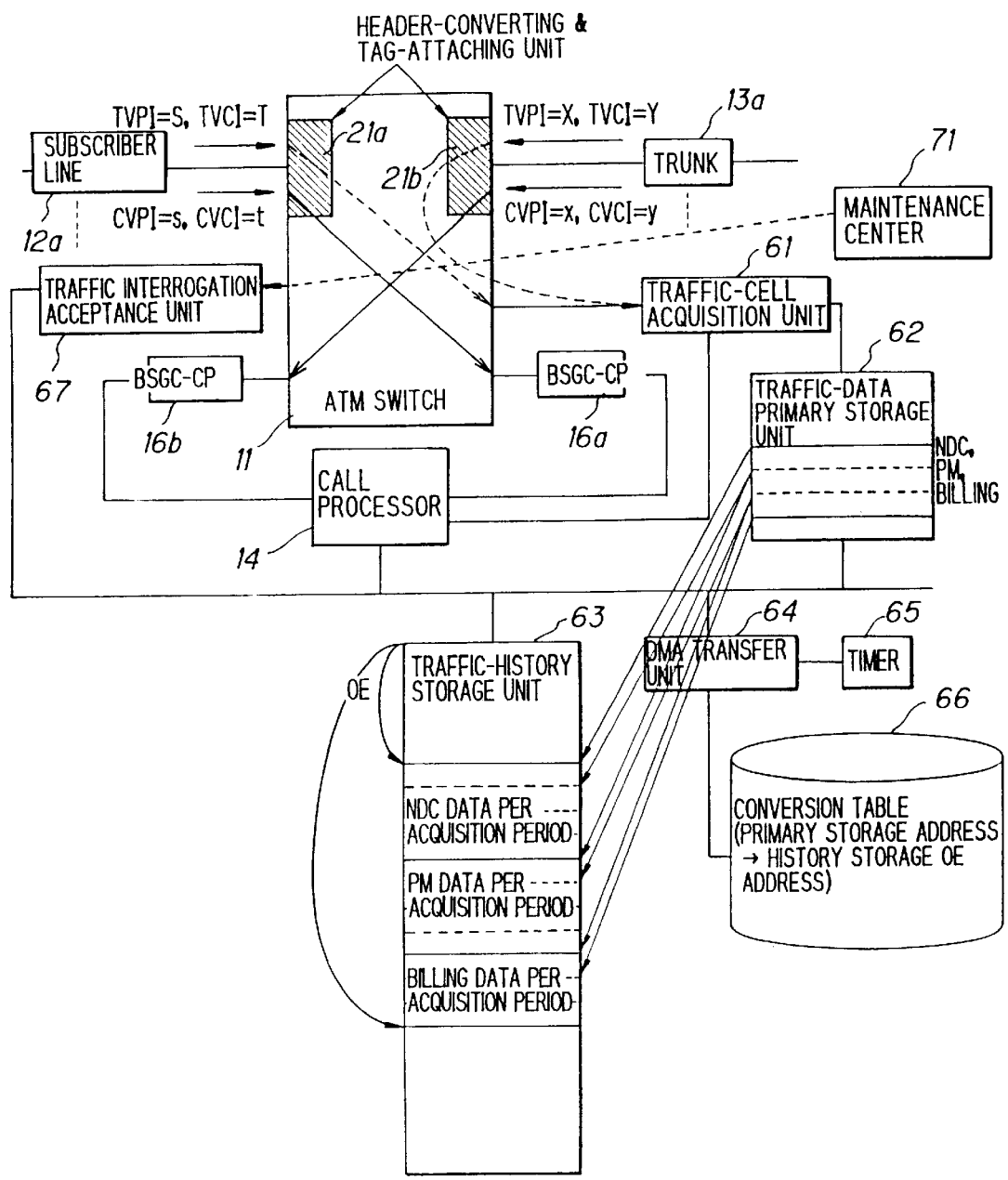
FIG. 14 is a block diagram illustrating the configuration of a sixth embodiment of the present invention.

FIG. 14 is a block diagram showing the sixth embodiment of the present invention. In the first embodiment, the traffic processor for collecting traffic data and the second signaling devices are provided. In the sixth embodiment, a traffic-cell acquisition unit is provided instead of the traffic processor and second signaling devices and this unit executes the collection and editing of traffic data to alleviate the load upon the call processor.

Shown in FIG. 14 are the ATM switch 11 for switching an input cell to a prescribed outgoing line, the subscriber line interfaces 12a . . . , the trunk circuits 13a . . . , the call processor 14 for executing call processing control based upon a call connect/disconnect request, the signaling devices 16a, 16b provided between the call processor 14 and the ATM switch 11 for applying prescribed signal processing to a call processing cell that has entered from a channel device (subscriber line interface or trunk line) via the ATM switch and entering the processed signal to the call processor 14, and the header-converting and tag-attaching units 21a, 21b.

A traffic-cell acquisition unit 61 is connected to the ATM switch 11 for collecting traffic cells, and a traffic-data primary storage unit 62 stores traffic data acquired by the traffic-cell acquisition unit 61. A traffic-history storage unit 63 stores traffic data per subscriber line or transmission line. A DMA transfer unit 64 DMA-transfers traffic data, which has been stored in the traffic-data primary storage unit 62, to the traffic-history storage unit 63 at prescribed times (e.g., every 15 minutes). A timer 65 gives notification of DMA transfer time. An address table 66 is for converting an address of the traffic-data primary storage unit 62 to an address of the traffic-history storage unit 63. A traffic interrogation acceptance unit 67, which is connected to the ATM switch 11, receives a traffic interrogation cell from a maintenance center 71 and transfers the traffic data requested by this cell.

The call processor 14, traffic-data primary storage unit 62, traffic-history storage unit 63, DMA transfer unit 64 and traffic interrogation acceptance unit 67 are interconnected by a bus and are capable of sending data to and receiving data from one another. The call processor 14 and traffic-cell acquisition unit 61 are interconnected so as to be capable of data communication. A PVC connection is established between the traffic interrogation acceptance unit 67 and the maintenance center 71 and can send and received traffic-data notification cells and traffic acquisition cells via this connection.

The traffic-data primary storage unit 62, which has a small storage capacity, possesses an area for storing one cycle of traffic data (NDC, PM, billing data), in each channel device, acquired at a prescribed period. The traffic-history storage unit 63, which has a large storage capacity, possesses an area for storing N-cycles of traffic data (NDC, PM, billing data), acquired at a prescribed period, corresponding to each channel device.

(b) Header-converting and tag-attaching unit (1) A replacement VPI/VCI and (2) tag information for routing a call processing cell, which is sent from a channel device, to the outgoing lines conforming to the signaling devices 16a, 16b are initially set, in correspondence with the VPI/VCI of the call processing cell, in the routing table, corresponding to each incoming line, in the VC converter circuits 21a, 21b. Further, (1) a replacement VPI/VCI and (2) tag information for routing a traffic-data notification cell, which is sent from a channel device, to the outgoing line conforming to the traffic-cell acquisition unit 61 are initially set, in correspondence with the VPI/VCI of the traffic-data notification cell, in each routing table.

The above-mentioned VPI/VCI (replacement VPI/VCI) stored in the routing table in correspondence with the VPI/VCI of the traffic-data notification cell is decided in the following manner: The VCI is decided so as to designate an address, which conforms to the channel device, of the traffic-data primary storage unit 62, and the VPI is decided in such a manner that the VPI will indicate the type (NDC data, PM data, billing data) of the traffic data. For example, $VPI=FFF_H$ is billing data, $VPI=FFE_H$ is PM data and $VPI=FFD_H$ is NDC data.

Figure 15:
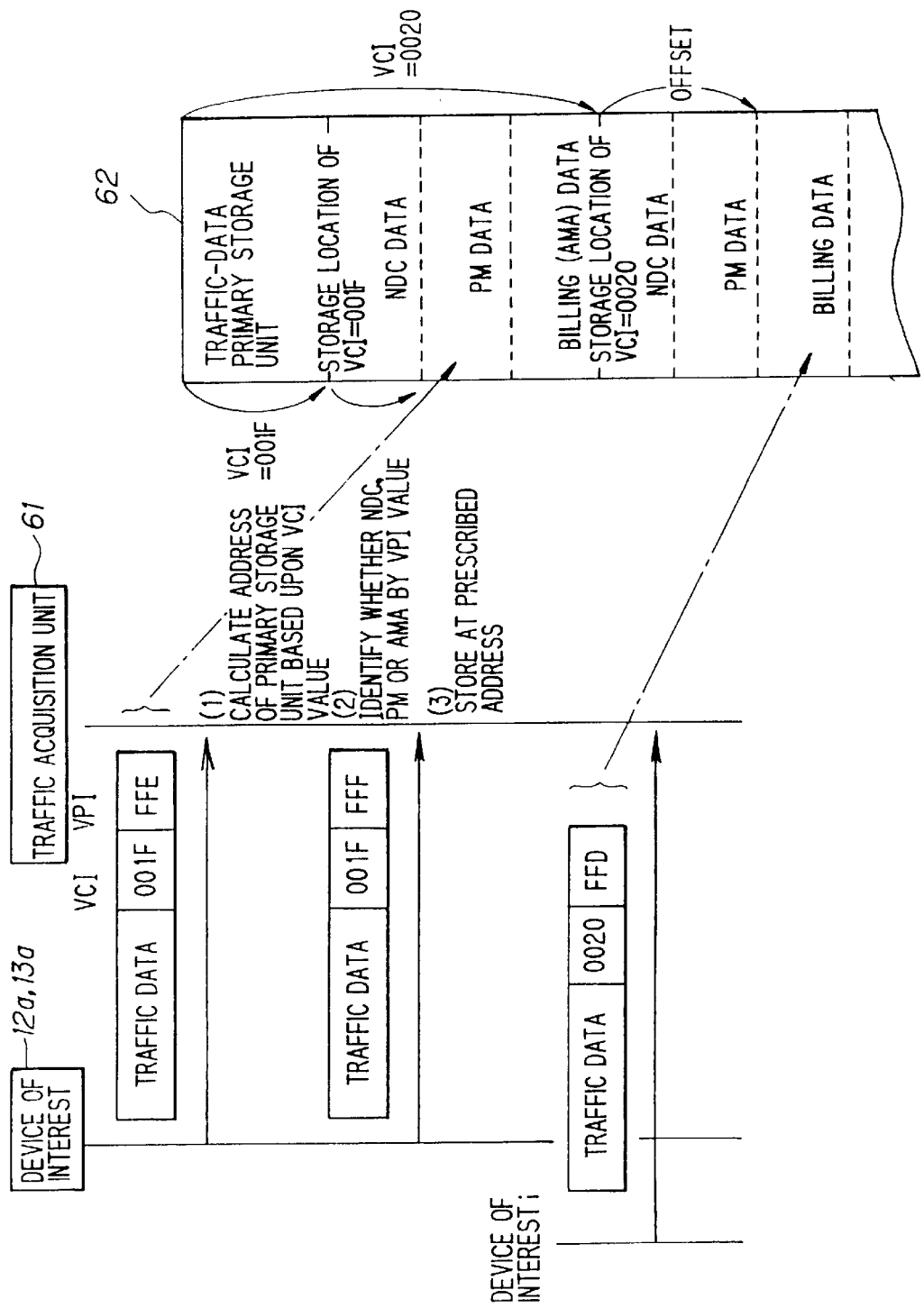
FIG. 15 is a diagram for describing the relationship between a VPI/VCI and a storage address.

Accordingly, when the traffic-cell acquisition unit 61 receives a traffic-data notification cell, the unit disassembles this cell and, as shown in FIG. 15, (1) computes the address of the primary storage unit 62 based upon the VCI value of the cell, and (2) identifies the type of traffic data based upon the VPI. (3) Thereafter, the traffic-cell acquisition unit 61 writes the traffic data (NDC, PM, billing data) at a location offset from the calculated address by a prescribed address conforming to the type of data.

(c) Cell transfer

When the call processing cell enters from a channel device, the header-converting and tag-attaching units 21a, 21b replace the VPI/VCI of the call processing cell, attach tag information and send the cell to the ATM switch 11. The latter refers to the tag information and outputs the call processing cell to the signaling devices 16a, 16b. The signaling devices 16a, 16b apply prescribed processing to the call processing cell and send the cell to the call processor 14.

Further, when the traffic-data notification cell enters from a channel device, the header-converting and tag-attaching units 21a, 21b replace the VPI/VCI of the traffic-data notification cell, attach tag information and send the cell to the ATM switch 11. The latter refers to the tag information and outputs the input cell to the output line conforming to the traffic-cell acquisition unit 61. The latter disassembles the traffic-data acquisition cell, computes the address of the primary storage unit 62 based upon the VCI value of the cell, and identifies the type of traffic data based upon the VPI. Thereafter, the traffic-cell acquisition unit 61 writes the traffic data at a location offset from the calculated address by a prescribed address conforming to the type of data.

(d) DMA transfer

The storage capacity of the traffic-data primary storage unit 62 is small. Accordingly, it is necessary to periodically transfer the data (traffic data) stored in the traffic-data primary storage unit 62 to the traffic-history storage unit 63, which has the large storage capacity.

Figure 16:
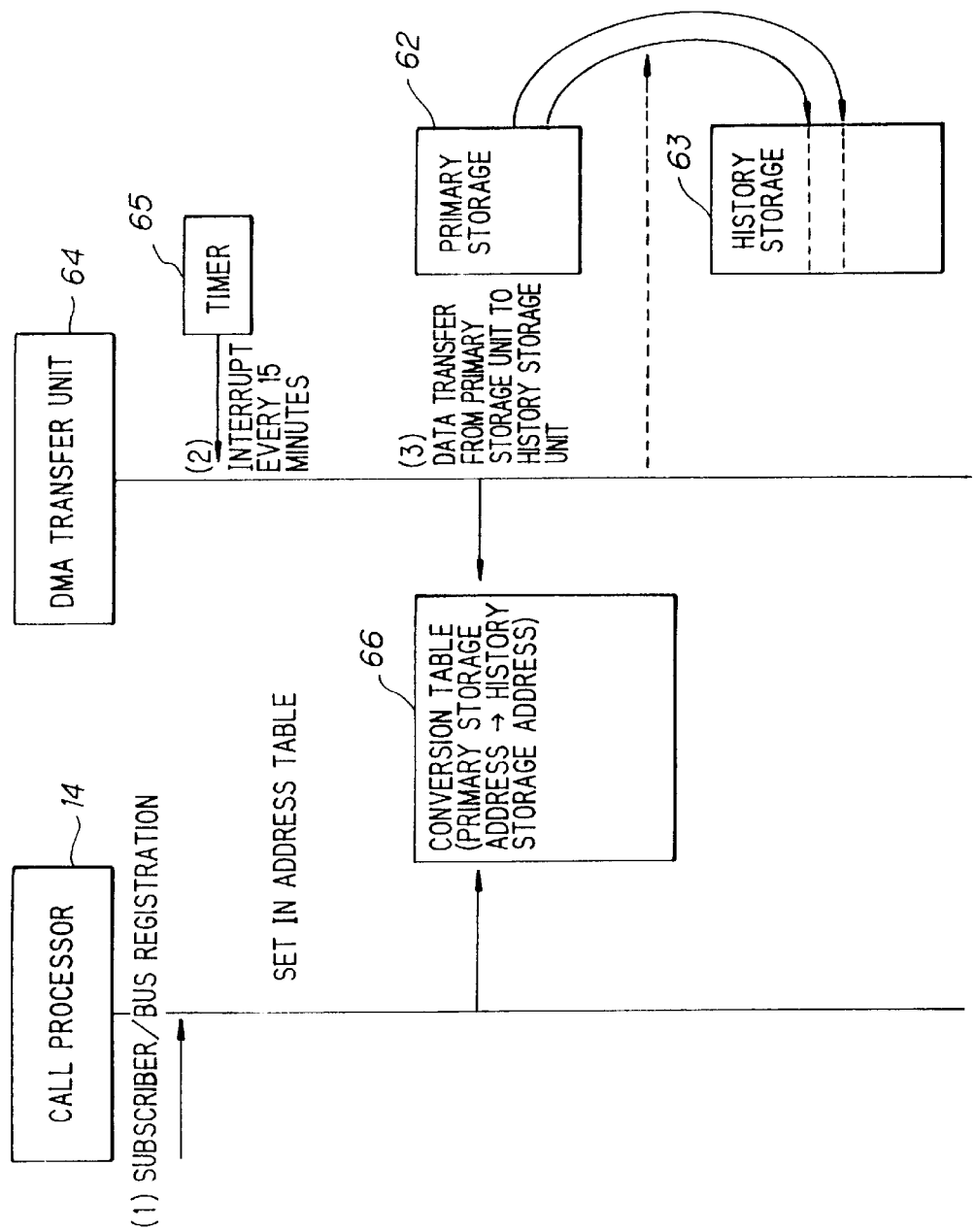
FIG. 16 is a diagram for describing a DMA transfer sequence.

FIG. 16 is a diagram for describing the sequence of the DMA transfer.

(1) When a subscriber or a connected path (transmission line) is registered, the call processor 14 registers the address of the primary storage unit 62 and the address of the traffic-history storage unit 63 in the conversion table 66 in correspondence with the channel device number (OE number). (2) Under such conditions, the timer 65 generates an interrupt for start of DMA transfer at a prescribed period, e.g., at 15-minute intervals. (3) When an interrupt is generated, the DMA transfer unit 64 refers to the conversion table 66, reads traffic data, per each channel device, from the primary storage unit 62 and transfers the data to a prescribed address of the traffic-history storage unit 63. As a result, the latest traffic data is DMA-transferred from the primary storage unit 62 to the traffic-history storage unit 63, and the traffic data (NDC, PM, billing data) per each channel device over a prescribed period of time is accumulated in the traffic-history storage unit 63.

(e) Collection of billing data

Figure 17:
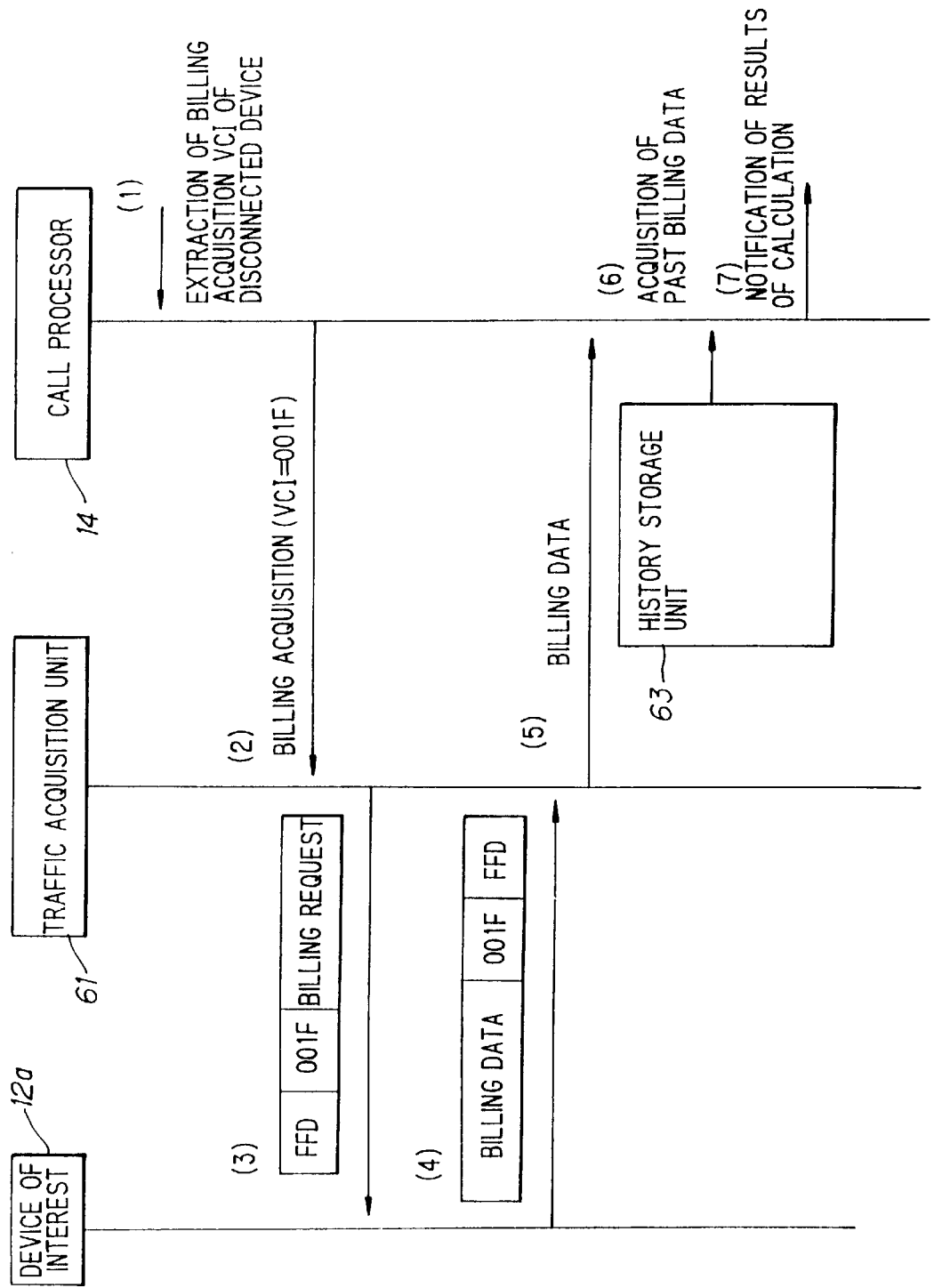
FIG. 17 is a diagram for describing a billing-data acquisition sequence.

FIG. 17 is a diagram for describing a sequence through which billing data is collected.

Billing data is collected and stored in the traffic-data primary storage unit 62 by the traffic-cell acquisition unit 61 at five-minute intervals and subsequently is transferred to and accumulated in the traffic-history storage unit 63. (1) When a call disconnect occurs under these conditions, the call processor 14 obtains the billing acquisition VCI of the device whose call has been disconnected in order to collect billing data over a period less than the last five minutes, and (2) attaches the VCI and requests the traffic-cell acquisition unit 61 to collect the billing data. (3) As a result, the traffic-cell acquisition unit 61 sends the channel device 12a a billing-data request cell having the received VCI. (4) Upon receiving the billing-data request cell, the channel device 12a places the billing data in the billing-data notification cell and then sends the cell to the traffic-cell acquisition unit 61. (5) The traffic-cell acquisition unit 61 obtains the billing data from this cell and communicates it to the call processor 14. (6) Upon receiving the billing data, the call processor 14 collects the billing data that has been stored in the traffic-history storage unit 63 and (7) totals the collected billing data and the received billing data to compute the bill.

(f) Transfer to maintenance center

Figure 18:
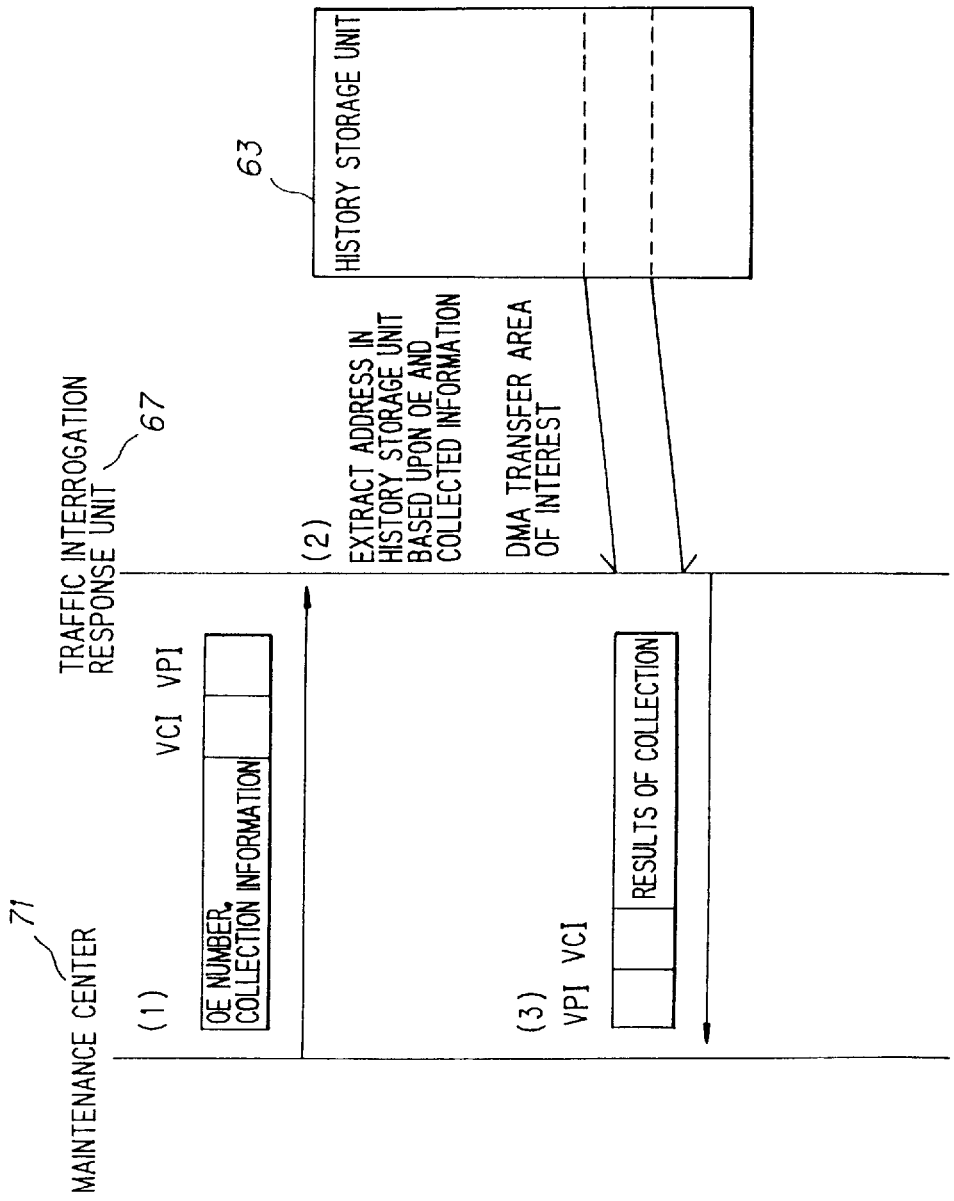
FIG. 18 is a diagram for describing a sequence for transferring data to a maintenance center.
Figure 19:
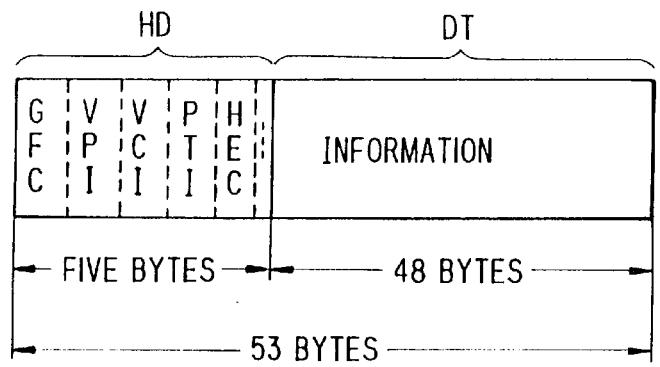
FIG. 19 is a diagram showing the composition of an ATM cell.
Figure 20:
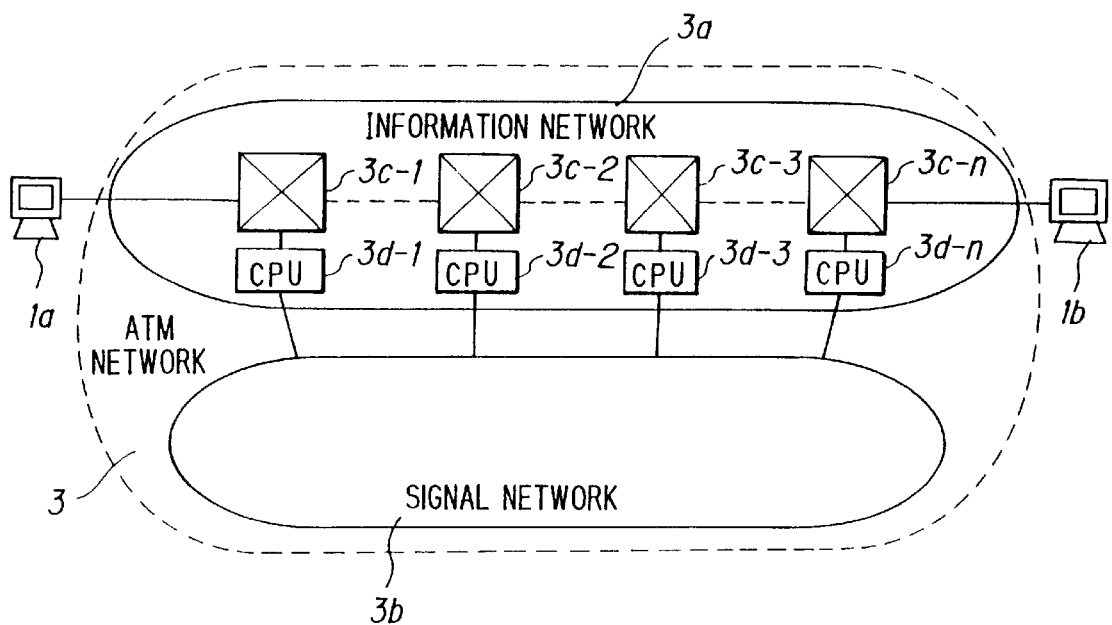
FIG. 20 is a diagram for describing the general principles of an ATM network.

FIG. 18 is a diagram for describing a sequence for transferring traffic data to the maintenance center 71. A PVC connection is established between the maintenance center 71 and the traffic interrogation acceptance unit 67. Accordingly, (1) the maintenance center 71 utilizes the connection to transfer a traffic-data acquisition cell, which contains the OE number of the device for which acquisition is desired as well as the collected information (e.g., the type of traffic data), to the traffic interrogation acceptance unit 67. (2) The traffic interrogation acceptance unit 67 obtains the address of the traffic-history storage unit 63 from the conversion table 66 using the OE number as the collected information as a key. (3) Thereafter, the DMA transfer unit 64 is instructed to DMA-transfer the traffic data of the area of interest, this traffic data is assembled into a cell and the cell is transferred to the maintenance center 71 via the PVC connection.

Thus, in accordance with the present invention as set forth above, an ATM exchange is provided with a call processor and a traffic processor, with call processing and processing for collecting and editing traffic data being split between these processors to reduce the load upon the call processor and make it possible to collect and edit traffic data and billing data without applying a load to the call processor.

Further, in accordance with the present invention, two or more traffic processors are provided in a case where the ATM exchange accommodates a large number of subscribers or paths (transmission lines), and processing for collecting and editing traffic data is shared by these processors. As a result, the load upon each traffic processor is alleviated and processing for collecting and editing traffic data can be executed with sufficient margin.

Furthermore, in accordance with the present invention, first signaling devices for signal processing are provided between the ATM switch and the call processor, second signaling devices for signal processing are provided between the ATM switch and the traffic processor, and cells for call processing and cells for collection of traffic data are sent and received between each channel device and the call processor and traffic processor via the first and second signaling devices and the ATM switch. If this arrangement is adopted, communication can be performed between each channel device and each processor in a cell format. As a result, the channel devices can execute call processing as well as traffic-data acquisition and editing processing even at locations far from the ATM exchange.

Further, in accordance with the present invention, a call processor and a traffic processor are interconnected so as to be capable of communicating with each other. Upon being notified of call connection by the call processor, the traffic processor collects billing data at prescribed time intervals. Upon being notified of call disconnection by the call processor, the traffic processor collects billing data over a period less than the last prescribed period of time. As a result, the call processor need only notify of call connection and disconnection. In other words, the collection of billing data is performed by the traffic processor and therefore the load upon the call processor can be reduced even further.

Further, in accordance with the present invention, channel devices provided in subscriber lines and in transmission lines are connected to a call processor and traffic processor by a bus so as to be capable of performing data communication, and the channel devices send and receive call processing data and traffic data to and from each of the processors via the bus line. As a result, call processing data and traffic data can be sent and received between the channel devices and each processor via the bus line even if signaling devices are not provided. The result is a simple construction.

Further, in accordance with the present invention, the call processor and traffic processor are not both provided. Instead, one processor for performing call processing and traffic data acquisition processing is provided, and signaling devices for subjecting a call processing cell and a traffic-data acquisition cell to prescribed signal processing are provided between the processor and the ATM switch. The call processing cell and traffic-data notification/acquisition cell are sent and received between each channel device and the processor via the signaling devices and ATM switch. As a result, a small-size ATM exchange can be constructed. Moreover, in a case where the ATM exchange accommodates a large number of subscribers, a traffic processor and the second signaling devices are connected to the ATM exchange, thereby making it possible to readily deal with these subscribers.

Further, in accordance with the present invention, the processor is made the call processor, a PVC connection is established between each channel device and a maintenance center with regard to a traffic-data notification cell, each channel device directly transfers the traffic-data notification cell to the maintenance center by utilizing the PVC connection, and the maintenance center collects and edits the traffic data. As a result, the construction of the ATM exchange can be simplified and the load upon the processor can be reduced.

Further, in accordance with the present invention, the processor is made the call processor and a traffic-cell acquisition unit is connected to the ATM switch. The ATM switch sends a call processing cell, which has entered from a channel device, to the call processor via a signaling device upon referring to a VPI/VCI that has been added to the call processing cell, and transfers the traffic-data notification cell, which has entered from a channel device, to the traffic-cell acquisition unit upon referring to the VPI/VCI that has been added to the traffic-data notification cell. As a result, the load upon the processor can be reduced.

In this case, the traffic-cell acquisition unit stores traffic data, per channel device and type of traffic data, in a small-capacity traffic data primary storage unit. A DMA transfer unit DMA transfers the traffic data from the primary storage unit to a large-capacity traffic-data history storage unit, and the traffic data (NDC data, PM data, billing data) is accumulated in the history storage unit per channel device and type of traffic data. As a result, traffic data can be accumulated without burdening the call processor.

Further, the ATM exchange is provided with a traffic interrogation acceptance unit, a PVC connection is established between this unit and a maintenance center, requested transfer data is read out of the history storage unit via this connection, the data is assembled into a cell and the cell is sent to the maintenance center. As a result, traffic data can be transmitted to the maintenance center without burdening the call processor.

As many apparently widely different embodiments of the present invention can be made without departing from the spirit and scope thereof, it is to be understood that the invention is not limited to the specific embodiments thereof except as defined in the appended claims.

What is claimed is:

1. An ATM exchange having a plurality of channel devices each of which serves as a subscriber line interface and is connected to a subscriber via a subscriber line, a plurality of other channel devices each of which serves as a network line interface and is connected to the network via a network line and an ATM switch for switching a cell, which has arrived from a subscriber line or a network line referred to as an incoming line and has a header, to another subscriber line or network line referred to as an outgoing line based upon a VPI/VCI contained in the header of the cell, said ATM exchange comprising:

a call processor for executing call processing control based upon a call connect/call disconnect request input from a channel device connected to a subscriber line or to a network line at the time of the call connection/call disconnection; and a traffic processor for collecting traffic data in a subscriber line connected to a subscriber via a user network interface or traffic data in a network line connected to a network via a network node interface.

2. The ATM exchange according to claim 1, further comprising:

a first signalling device provided between said call processor and said ATM switch for applying prescribed processing to a call processing cell, which was generated in a channel device connected to a subscriber line or to a network line at the time of call connection/call disconnection and has entered from said channel device via said ATM switch, and then the processed cell enters into said call processor as a cell of the call connect/call disconnect request; and a second signaling device provided between said traffic processor and said ATM switch for applying prescribed processing to a traffic-data notification cell, which was generated in a channel device connected to a subscriber line or to a network line and said traffic notification cell enters said second signaling device from said channel device via said ATM switch, and then the processed cell enters into said traffic processor;

wherein said ATM switch connects a call processing cell, which has entered from a channel device, to said first signaling device upon referring to a VPI/VCI that has been attached to the call processing cell, and connects a traffic-data notification cell, which has entered from a channel device, to said second signaling device upon referring to a VPI/VCI that has been attached to the traffic-data notification cell.

3. The ATM exchange according to claim 2, wherein said ATM switch has header-converting and tag-attaching means which is provided for each incoming line and is equipped with a VCI conversion table including tag information and a correspondence between input VPI/VCI and output VPI/VCI added to a cell instead of said input VPI/VCI, said ATM switch referring to said table to replace the input VPI/VCI of the call processing cell sent from the channel device via the respective incoming line by the output VPI/VCI, and attaching the tag information to the cell for routing the cell to a prescribed outgoing line;

said call processor initially sets, said tag information and said correspondence between the input VPI/VCI of the call processing cell sent from a channel device and the output VPI/VCI added to the call processing cell instead of said input VPI/VCI in said conversion table of the respective header-converting and tag-attaching means; and said traffic processor initially sets said tag information and said correspondence between the input VPI/VCI of the traffic-data notification cell sent from a channel device and the output VPI/VCI added to the traffic-data notification cell instead of said input VPI/VCI, in said conversion table of the respective header-converting and tag-attaching means.

4. The ATM exchange according to claim 3, wherein each of said first and second signalling devices has header-converting and tag-attaching means, equipped with a VCI conversion table including tag information and a correspondence between input VPI/VCI and output VPI/VCI added to a cell instead of said input VPI/VCI, for referring to said table to replace the input VPI/VCI of a cell to be sent to a channel device by the output VPI/VCI, and attaching the tag information to the cell from routing the cell to a prescribed channel device;

said call processor initially sets contents of the conversion table of the header-converting and tag-attaching means in said first signaling device; and said traffic processor initially sets contents of the conversion table of the header-converting and tag-attaching means in said second signaling device.

5. The ATM exchange according to claim 2, further comprising a plurality of traffic processors for traffic data acquisition and a plurality of second signaling devices.

6. The ATM exchange according to claim 2, wherein said traffic processor sends a traffic-data acquisition cell to each channel device via said second signaling device and said ATM switch at a prescribed time period, and each channel device responds to reception of said traffic-data acquisition cell by communicating traffic data of a subscriber line or traffic data of a transmission line, which has been connected to said ATM switch, to said traffic processor via said ATM switch and said second signaling device.

7. The ATM exchange according to claim 6, wherein when notification indicating that traffic data has exceeded a threshold value is received from a channel device, said traffic processor requests this channel device for details of the traffic data.

8. The ATM exchange according to claim 6, wherein said call processor and said traffic processor are interconnected so as to be capable of communicating with each other, and said traffic processor collects billing data from a channel device at prescribed times after said traffic processor is given notification of call connection by said call processor and collects last billing data within said prescribed time from said channel device when said traffic processor is given notification of call disconnection by said call processor.

9. An ATM exchange having a plurality of channel devices each of which serves as a subscriber line interface and is connected to a subscriber via a subscriber line, a plurality of other channel devices each of which serves as a network line interface and is connected to the network via a network line and an ATM switch for switching a cell, which has arrived from a subscriber line or network line referred to as an incoming line and has a header, to another subscriber line or network line referred to as an outgoing line based upon a VPI/VCI contained in the header of the cell, said ATM exchange comprising:

a call processor for executing call processing control based upon call processing data which has generated in a channel device connected to a subscriber line or to a network line at the time of a call connect/call disconnect request;

a traffic processor for collecting traffic data in a subscriber line connected to a subscriber via a user network interface or traffic data in a network line connected to a network via a network node interface; and a bus for interconnecting channel devices provided in respective ones of subscriber lines and network lines, thereby enabling said call processor and said traffic processor to communicate the call processing data and the traffic data with one another;

wherein the call processing data and the traffic data are sent and received between each channel device and said call processor and traffic processor via said bus.

10. The ATM exchange according to claim 9, wherein said traffic processor collects traffic data of a subscriber line and transmission line from each channel device via said bus line at a prescribed time period, collects billing data from a channel device at prescribed times after said traffic processor is given notification of call connection by said call processor and collects last billing data within said prescribed time from said channel device when said traffic processor is given notification of a call disconnection by said call processor.

11. An ATM exchange having a plurality of channel devices each of which serves as a subscriber line interface and is connected to a subscriber via a subscriber line, a plurality of other channel devices each of which serves as a network line interface and is connected to the network via a network line and an ATM switch for switching a cell, which has arrived from a subscriber line or network line referred to as an incoming line and has a header, to another subscriber line or network line referred to as an outgoing line based upon a VPI/VCI contained in the header of the cell, said ATM exchange comprising:

a processor for executing call processing control based upon a call connect/call disconnect request input from a channel device connected to a subscriber line or to a network line at the time of call connection/call disconnection and for collecting traffic data in a subscriber line connected to a subscriber via a user network interface or traffic data in a network line in a network via a network node interface; and a signaling device provided between said processor and said ATM switch for applying prescribed processing to a call processing cell, which device connected to a subscriber line or to a network line at the time of call connection/call disconnection and enters said signaling device from said channel device via said ATM switch, and then said call processing cell enters into said processor, and for applying prescribed processing to a traffic-data notification cell, which was generated in a channel device connected to a subscriber line or to a network line and then is transmitted from said channel device via said ATM switch, and said traffic-data notification cell into said traffic processor;

wherein said ATM switch enters a call processing cell into said signaling device upon referring to a VPI/VCI that has been attached to the call processing cell, and enters a traffic-data notification cell into said signaling device upon referring to a VPI/VCI that has been attached to the traffic-data notification cell.

12. An ATM exchange having a plurality of channel devices each of which serves as a subscriber line interface and is connected to a subscriber via a subscriber line, a plurality of other channel devices each of which serves as a network line interface and is connected to the network via a network line and an ATM switch for switching a cell, which has arrived from a subscriber line or network line referred to as an incoming line and has a header, to another subscriber line or network line referred to as an outgoing line based upon a VPI/VCI contained in the header of the cell, said ATM exchange comprising:

a processor for executing call processing control based upon a call connect/call disconnect request input from a channel device connected to a subscriber line or to a network line at the time of call connection/call disconnection; and a signaling device provided between said processor and said ATM switch for applying prescribed processing to a call processing cell, which was generated in a channel device connected to a subscriber line or to a network line at the time of call connection/call disconnection and said call processing cell enters said signaling device from said channel device via said ATM switch, and then said processed cell enters into said processor;

wherein said ATM switch has means for outputting a call processing cell, which was generated in a channel device and then is transmitted from the channel device, to said signaling device upon referring to a VPI/VCI that has been attached to the call processing cell, and for outputting a traffic-data notification cell, which has generated in a channel device and entered from the channel device, to an outgoing line connected to a maintenance center for traffic data acquisition upon referring to a VPI/VCI that has been attached to the traffic-data notification cell;

a permanent virtual channel (PVC) connection being established, in relation to the traffic-data notification cell, between each channel device and said maintenance center, each channel device transferring a traffic-data notification cell to said maintenance center by utilizing the PVC connection, and said maintenance center collecting and editing traffic data.

13. An ATM exchange having a plurality of channel devices each of which serves as a subscriber line interface and is connected to a subscriber via a subscriber line, a plurality of other channel devices each of which serves as a network line interface and is connected to the network via a network line and an ATM switch for switching a cell, which has arrived from a subscriber line or network line referred to as an incoming line and has a header, to another subscriber line or network line referred to as an outgoing line based upon a VPI/VCI contained in the header of the cell, said ATM exchange comprising:

a processor for executing call processing control based upon a call connect/call disconnect request input from a channel device connected to a subscriber line or to a network line at the time of the call connection/call disconnection; and a signaling device provided between said call processor and said ATM switch for applying prescribed processing to a call processing cell, which has generated in a channel device connected to a subscriber line or to a network line at the time of call connection/call disconnection and said call processing cell enters said signaling device from said channel device via said ATM switch, and then entering said processed cell into said call processor;

a traffic-cell acquisition unit connected to said ATM switch; and a traffic-data primary storage unit for storing traffic data collected by said traffic-cell acquisition unit;

wherein said ATM switch outputs a call processing cell, which has entered from a channel device, to said signaling device upon referring to a VPI/VCI that has been added to the call processing cell, and outputs the traffic-data notification cell, which has entered from a channel device, to an outgoing line connected to the traffic- cell acquisition unit upon referring to a VPI/VCI that has been added to the traffic-data notification cell.

14. The ATM exchange according to claim 13, wherein said ATM switch is provided, in correspondence with each incoming line, header-converting sand tag-attaching means, equipped with a VCI conversion table including tag information and a correspondence between input VPI/VCI and output VPI/VCI added to a cell instead of said input VPI/VCI, said ATM switch referring to said table to replace the VPI/VCI of an input cell by the output VPI/VCI and attaching tag information to the input cell for outputting the input cell to a prescribed outgoing line;

a set of a prescribed VPI and a VCI that differs for each channel device, which set is to replace the VPI/VCI of the traffic-data notification cell sent from channel device, is set in each table in advance, and said header-converting and tag-attaching means replaces the VPI/VCI of a traffic-data notification cell, which has entered from a channel device, with the set VPI and the VCI corresponding to the channel device;

said ATM switch routes said traffic-data notification cell to an outgoing line conforming to said traffic-cell acquisition unit; and said traffic-cell acquisition unit stores traffic data at an address of said traffic-data primary storage unit conforming to the VPI/VCI of the traffic-data notification cell.

15. The ATM exchange according to claim 14, wherein a VPI value is changed depending upon type of traffic data and a set of VPI values and VCIs corresponding to channel devices is set in the table in advance;

said header-converting and tag-attaching means replaces the VPI/VCI of a traffic-data notification cell, which has entered from a channel device, with the VPI conforming to the type of traffic data communicated and the VCI corresponding to a channel device; and said traffic-cell acquisition unit stores the traffic data of said type at an address of said traffic-data primary storage unit conforming to the VPI/VCI of the traffic-data notification cell received.

16. The ATM exchange according to claim 13, further comprising:

a DMA transfer unit; and a traffic-history storage unit for storing traffic data per subscriber line or per transmission line;

wherein said DMA transfer unit stores traffic data, which has been stored in said traffic-data primary storage unit, in said traffic-data history storage unit per subscriber line or per transmission line by a DMA transfer.

17. The ATM exchange according to claim 16, further comprising:

a correspondence table for indicating correspondence between an address of said traffic-data primary storage unit and an address of said traffic-data history storage unit in correspondence with a subscriber line or transmission line;

wherein said DMA transfer unit refers to said table to DMA transfer traffic data from said traffic-data primary storage unit to said traffic-data history storage unit.

18. The ATM exchange according to claim 16, further comprising:

a traffic-interrogation response unit connected to said ATM switch and connected, via a bus, to said traffic-history storage unit;

wherein a PVC connection is established between said traffic interrogation-response unit and a maintenance center, and said traffic-interrogation response unit reads traffic data requested by said maintenance center out of said traffic-history storage unit, assembles the traffic data into a cell and transfers the cell to said maintenance center via said PVC connection.

19. The ATM exchange according to claim 16, wherein said traffic data includes billing data and billing data per subscriber line is accumulated in said traffic-data history storage unit;

said call processor sends a billing-data editing VCI of a channel device to said traffic-cell acquisition unit when a call is disconnected; and said traffic-cell acquisition unit attaches said billing-data editing VCI to a billing-data request cell and sends said billing-data request cell to a channel device, and said call processor perform bill calculation processing by summing billing data that has been sent from a channel device and billing data that has been accumulated in said traffic-data history storage unit.

20. An ATM exchange having a plurality of channel devices each of which serves as a line interface and is connected to a subscriber or network via a line, and an ATM switch for switching a cell, which has arrived from a line to another line based upon a connection identifier contained in a header of the cell, said ATM exchange comprising:

a call processor for executing call processing control based upon a call connect/call disconnect request input from a channel device connected to said line at the time of call connection/call disconnection; and a traffic processor for collecting traffic data in said line connected to a subscriber or network via the channel devices.

* * * * *